United States Patent
Chen et al.

(10) Patent No.: US 11,256,114 B2
(45) Date of Patent: Feb. 22, 2022

(54) SEMICONDUCTOR DEVICE AND METHOD OF MAKING

(71) Applicant: TAIWAN SEMICONDUCTOR MANUFACTURING COMPANY LIMITED, Hsin-Chu (TW)

(72) Inventors: Yi-Chen Chen, Jhubei (TW); Ming Chyi Liu, Hsinchu (TW); Shih-Wei Lin, Taipei (TW)

(73) Assignee: TAIWAN SEMICONDUCTOR MANUFACTURING COMPANY LIMITED, Hsin-Chu (TW)

( * ) Notice: Subject to any disclaimer, the term of this patent is extended or adjusted under 35 U.S.C. 154(b) by 0 days.

(21) Appl. No.: 16/787,976

(22) Filed: Feb. 11, 2020

(65) Prior Publication Data
US 2021/0247633 A1    Aug. 12, 2021

(51) Int. Cl.
| G02B 6/13 | (2006.01) |
| G02B 6/12 | (2006.01) |
| G02F 1/025 | (2006.01) |
| F21V 8/00 | (2006.01) |

(52) U.S. Cl.
CPC ........... *G02F 1/025* (2013.01); *G02B 6/0013* (2013.01); *G02B 6/12* (2013.01); *G02B 6/13* (2013.01); *G02B 2006/12035* (2013.01)

(58) Field of Classification Search
None
See application file for complete search history.

(56) References Cited

U.S. PATENT DOCUMENTS

| 8,213,751 | B1 | 7/2012 | Ho et al. |
| 2005/0077628 | A1 | 4/2005 | Kumar et al. |
| 2008/0253728 | A1* | 10/2008 | Sparacin ............... G02B 6/122 385/132 |
| 2012/0195547 | A1 | 8/2012 | Rasras |
| 2016/0170139 | A1 | 6/2016 | Absil et al. |
| 2016/0233641 | A1* | 8/2016 | Chantre ............ G02B 6/12004 |
| 2016/0327741 | A1 | 11/2016 | Wu et al. |
| 2017/0045686 | A1 | 2/2017 | Lee et al. |
| 2017/0278744 | A1 | 9/2017 | Wang et al. |

FOREIGN PATENT DOCUMENTS

| EP | 2685297 A1 | 1/2014 |
| KR | 20170112941 A | 10/2017 |

* cited by examiner

*Primary Examiner* — Omar R Rojas
(74) *Attorney, Agent, or Firm* — Cooper Legal Group, LLC

(57) ABSTRACT

A semiconductor device is provided. The semiconductor device includes a silicon nitride waveguide in a first dielectric layer over a substrate. The semiconductor device includes a semiconductor waveguide in a second dielectric layer over the first dielectric layer. The first dielectric layer including the silicon nitride waveguide is between the second dielectric layer including the semiconductor waveguide and the substrate.

20 Claims, 15 Drawing Sheets

SEMICONDUCTOR DEVICE AND METHOD OF MAKING

BACKGROUND

Semiconductor devices are used in a multitude of electronic devices, such as mobile phones, laptops, desktops, tablets, watches, gaming systems, and various other industrial, commercial, and consumer electronics. Semiconductor devices generally comprise semiconductor portions and wiring portions formed inside the semiconductor portions.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
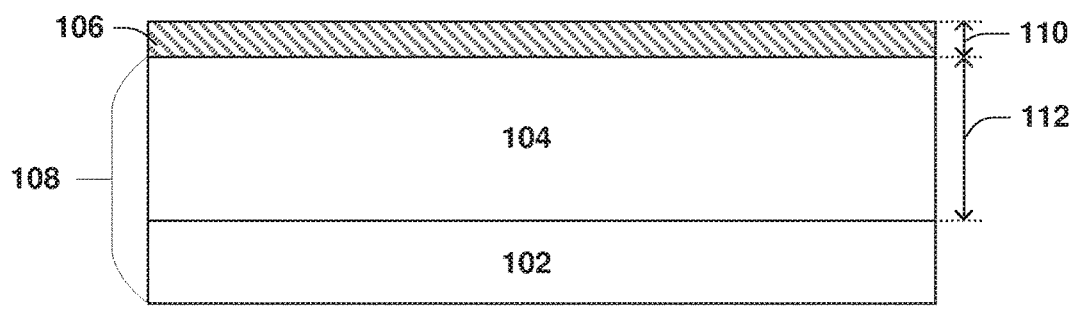
FIGS. 1-15 illustrate cross-sectional views of a semiconductor device at various stages of fabrication, in accordance with some embodiments.

The following disclosure provides several different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals or letters in the various examples. This repetition is for the purpose of simplicity and clarity and does not in itself dictate a relationship between the various embodiments or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation illustrated in the figures. The apparatus may be otherwise oriented (rotated 90 degrees or at other orientations) and the spatially relative descriptors used herein may likewise be interpreted accordingly.

Some embodiments relate to a semiconductor device. In accordance with some embodiments, the semiconductor device comprises a silicon nitride waveguide and a semiconductor waveguide. In some embodiments, the silicon nitride waveguide is in a first dielectric layer over a substrate, such as a semiconductor wafer. In some embodiments, the semiconductor waveguide is in a second dielectric layer over the first dielectric layer. In some embodiments, the semiconductor device comprises a modulator structure in the second dielectric layer. In some embodiments, an electrical signal is transmitted to the modulator structure from a conductive structure over the modulator structure. In some embodiments, the conductive structure is connected to the modulator structure by a via. In some embodiments, the electrical signal is converted by the modulator structure to an optical signal. In some embodiments, the optical signal is propagated via at least one of the semiconductor waveguide or the silicon nitride waveguide. According to some embodiments, the semiconductor device has a reduced distance between the conductive structure and the modulator structure as compared with some semiconductor devices having the silicon nitride waveguide over the modulator structure and the semiconductor waveguide. According to some embodiments, the semiconductor device having the reduced distance provides for a reduced amount of signal loss, noise introduction, etc. of the electrical signal, such as might otherwise occur through a longer via as compared to a via corresponding to the reduced distance between the conductive structure and the modulator structure.

In some embodiments, the silicon nitride waveguide of the semiconductor device is at least one of formed or annealed prior to at least one of forming the semiconductor waveguide, forming the modulator structure, or forming the substrate. In some embodiments, annealing the silicon nitride waveguide at least one of reduces or removes hydrogen of the silicon nitride waveguide. In some embodiments, at least one of the removal of hydrogen or the reduction in hydrogen of the silicon nitride waveguide provides for lower propagation loss of a signal, such as an optical signal, that is propagated via the silicon nitride waveguide.

In some embodiments, the semiconductor device comprises a photonic device, such as a silicon-based photonic integrated circuit (IC), configured to transmit an optical signal having a wavelength between about 1,500 nanometers and about 1,600 nanometers, such as about 1,550 nanometers. In some embodiments, performing an annealing process on the silicon nitride waveguide prior to at least one of forming the semiconductor waveguide, forming the modulator structure, or forming the substrate at least one of provides for reduced propagation loss of an optical signal propagated via the silicon nitride waveguide, enables the semiconductor device to propagate optical signals having wavelengths between about 1,500 nanometers and about 1,600 nanometers, or prevents the annealing process from affecting at least one of the semiconductor waveguide, the modulator structure, or the substrate, such as at least one of activating, migrating, etc. dopants, melting materials, etc. in at least one of the semiconductor waveguide, the modulator structure, or the substrate.

FIGS. 1-15 are cross-sectional views of a semiconductor device 100, in accordance with some embodiments. In some embodiments, the semiconductor device 100 comprises a communication device, such as a transceiver. According to some embodiments, the semiconductor device 100 comprises a photonic device, such as a silicon-based photonic IC. In some embodiments, the semiconductor device 100 is configured for at least one of optical communication or propagation of an optical signal. Other structures and configurations of the semiconductor device 100 are within the scope of the present disclosure.

FIG. 1 illustrates the semiconductor device 100 according to some embodiments. In some embodiments, the semiconductor device 100 comprises a semiconductor layer 106 and one or more layers 108. In some embodiments, the semiconductor layer 106 overlies the one or more layers 108. In some embodiments, the semiconductor layer 106 is in direct contact with an uppermost surface of the one or more layers 108. In some embodiments, the semiconductor layer 106 comprises at least one of a semiconductor material or other suitable material. According to some embodiments, the semiconductor layer 106 comprises silicon, such as monocrystalline silicon, crystalline silicon with a <100> crystallographic orientation, crystalline silicon with a <110> crystallographic orientation or other suitable material. In some embodiments, the semiconductor layer 106 has a thickness 110 between about 2,000 angstroms and about 4,000 angstroms. Other values of the thickness 110 are within the scope of the present disclosure.

In some embodiments, the one or more layers 108 comprise at least one of a first substrate 102, a first dielectric layer 104, or a different layer. The first substrate 102 comprises at least one of an epitaxial layer, a silicon-on-insulator (SOI) structure, a wafer, or a die formed from a wafer. Other structures and configurations of the first substrate 102 are within the scope of the present disclosure. The first substrate 102 comprises at least one of silicon, germanium, carbide, arsenide, gallium, arsenic, phosphide, indium, antimonide, SiGe, SiC, GaAs, GaN, GaP, InGaP, InP, InAs, InSb, GaAsP, AlInAs, AlGaAs, GaInAs, GaInP, GaInAsP, or other suitable material. According to some embodiments, the first substrate 102 comprises monocrystalline silicon, crystalline silicon with a <100> crystallographic orientation, crystalline silicon with a <110> crystallographic orientation, or other suitable material. In some embodiments, the first substrate 102 comprises at least one doped region.

The first dielectric layer 104 is formed over the first substrate 102, according to some embodiments. In some embodiments, the first dielectric layer 104 overlies the first substrate 102. In some embodiments, the first dielectric layer 104 is in direct contact with a top surface of the first substrate 102. In some embodiments, the first dielectric layer 104 comprises at least one of silicon, nitride, oxide, such as $SiO_2$, or other suitable material. In some embodiments, the first dielectric layer 104 is a bottom oxide (BOX). Other structures and configurations of the first dielectric layer 104 are within the scope of the present disclosure. The first dielectric layer 104 is formed by at least one of physical vapor deposition (PVD), sputtering, chemical vapor deposition (CVD), low pressure CVD (LPCVD), atomic layer chemical vapor deposition (ALCVD), ultrahigh vacuum CVD (UHVCVD), reduced pressure CVD (RPCVD), atomic layer deposition (ALD), molecular beam epitaxy (MBE), liquid phase epitaxy (LPE), spin on, growth, or other suitable techniques. In some embodiments, the first dielectric layer 104 has a thickness 112 between about 5,000 angstroms and about 35,000 angstroms. Other values of the thickness 112 are within the scope of the present disclosure.

In some embodiments, the semiconductor layer 106 is formed over the first dielectric layer 104. In some embodiments, the semiconductor layer 106 overlies the first dielectric layer 104. In some embodiments, the semiconductor layer 106 is in direct contact with a top surface of the first dielectric layer 104. The semiconductor layer 106 is formed by at least one of PVD, sputtering, CVD, LPCVD, ALCVD, UHVCVD, RPCVD, ALD, MBE, LPE, spin on, growth, or other suitable techniques.

Figure 2:
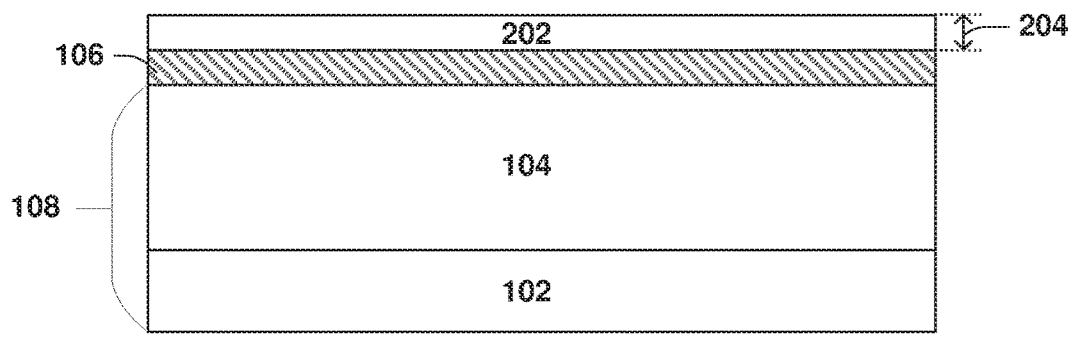

FIG. 2 illustrates a second dielectric layer 202 formed over the semiconductor layer 106, according to some embodiments. In some embodiments, the second dielectric layer 202 overlies the semiconductor layer 106. In some embodiments, the second dielectric layer 202 is in direct contact with a top surface of the semiconductor layer 106. In some embodiments, the second dielectric layer 202 comprises at least one of silicon, nitride, oxide, such as $SiO_2$, or other suitable material. Other structures and configurations of the second dielectric layer 202 are within the scope of the present disclosure. The second dielectric layer 202 is formed by at least one of PVD, sputtering, CVD, LPCVD, ALCVD, UHVCVD, RPCVD, ALD, MBE, LPE, spin on, growth, or other suitable techniques. In some embodiments, a thickness 204 of the second dielectric layer 202 is at least 1,000 angstroms. Other values of the thickness 204 are within the scope of the present disclosure.

Figure 3:
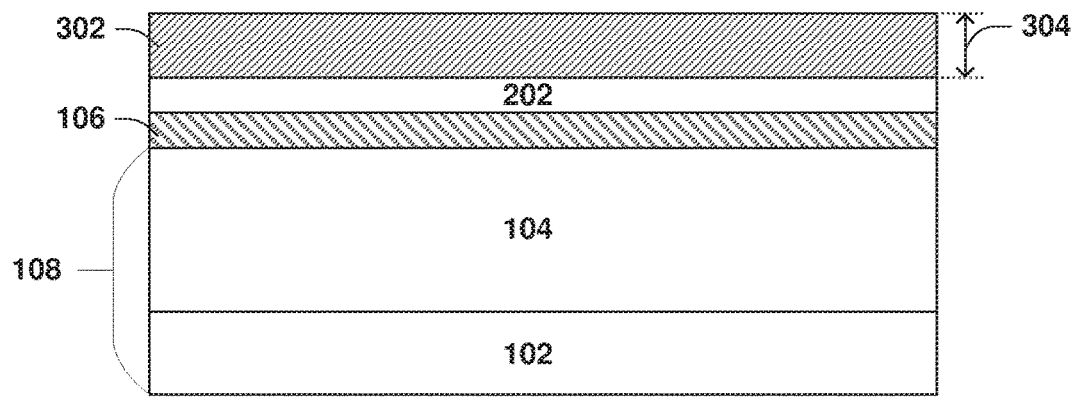

FIG. 3 illustrates a silicon nitride layer 302 formed over the second dielectric layer 202, according to some embodiments. In some embodiments, the silicon nitride layer 302 overlies the second dielectric layer 202. In some embodiments, the silicon nitride layer 302 is in direct contact with a top surface of the second dielectric layer 202. In some embodiments, the silicon nitride layer 302 comprises $Si_xN_y$, or other suitable material. In some embodiments, x is 3 or a different suitable value. In some embodiments, y is 4 or a different suitable value. The silicon nitride layer 302 is formed by at least one of PVD, sputtering, CVD, LPCVD, ALCVD, UHVCVD, RPCVD, ALD, MBE, LPE, spin on, growth, or other suitable techniques. In some embodiments, the silicon nitride layer 302 has a thickness 304 between about 4,000 angstroms and about 10,000 angstroms. Other values of the thickness 304 are within the scope of the present disclosure.

In some embodiments, the silicon nitride layer 302 comprises hydrogen. In some embodiments, at least some of the hydrogen is formed in the silicon nitride layer 302 as a result of one or more chemical reactions of a formation process for forming the silicon nitride layer 302. In some embodiments, the one or more chemical reactions of the formation process comprise at least one of $3SiH_4(g)+4NH_3(g) \rightarrow Si_3N_4(s)+12H_2(g)$, $3SiCl_2H_2(g)+4NH_3(g) \rightarrow Si_3N_4(s)+6HCl(g)+6H_2(g)$, or a different chemical reaction.

In some embodiments, the silicon nitride layer 302 is annealed in a first annealing process to at least one of reduce or remove the hydrogen of the silicon nitride layer 302. In some embodiments, the first annealing process comprises annealing the silicon nitride layer 302 at a temperature of at least 1,000° C. or a temperature of at least 1,100° C. Other temperatures for performing the first annealing process are within the scope of the present disclosure. In some embodiments, the first annealing process comprises annealing the silicon nitride layer 302 for a duration of time of at least 40 minutes or a duration of time of at least 60 minutes. Other durations of time for performing the first annealing process are within the scope of the present disclosure. In some embodiments, given that the silicon nitride layer 302 is part of the semiconductor device 100, the first annealing process comprises annealing at least one of the silicon nitride layer 302, the second dielectric layer 202, the semiconductor layer 106, or the one or more layers 108, such as at least one of the first dielectric layer 104 or the first substrate 102. Other processes, techniques, and parameters for annealing the silicon nitride layer 302 are within the scope of the present disclosure.

Figure 4:
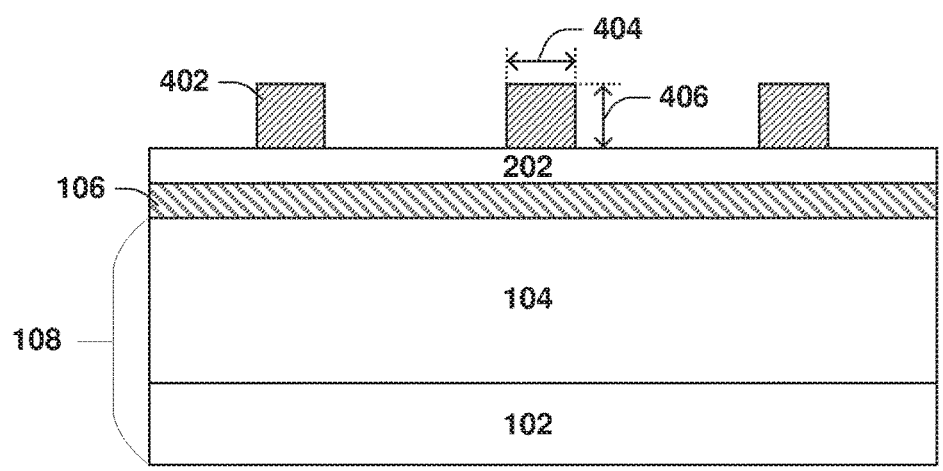

FIG. 4 illustrates one or more silicon nitride waveguides 402 formed over the second dielectric layer 202, according to some embodiments. In some embodiments, the one or more silicon nitride waveguides 402 vary from one another to have at least one of different lengths, depths, thicknesses, widths, material compositions, etc. In some embodiments, the one or more silicon nitride waveguides 402 do not vary from one another to have at least one of different lengths, depths, thicknesses, widths, material compositions, etc. Even though three silicon nitride waveguides 402 are depicted, any number of silicon nitride waveguides 402 are contemplated.

In some embodiments, the silicon nitride layer 302 is patterned to form the one or more silicon nitride waveguides 402. In some embodiments, the silicon nitride layer 302 is patterned to form the one or more silicon nitride waveguides 402 using a photoresist (not shown). In some embodiments, the photoresist is formed over the silicon nitride layer 302. The photoresist is formed by at least one of PVD, sputtering, CVD, LPCVD, ALCVD, UHVCVD, RPCVD, ALD, MBE, LPE, spin on, growth, or other suitable techniques. The photoresist comprises a light-sensitive material, where properties, such as solubility, of the photoresist are affected by light. The photoresist is a negative photoresist or a positive photoresist. With respect to a negative photoresist, regions of the negative photoresist become insoluble when illuminated by a light source, such that application of a solvent to the negative photoresist during a subsequent development stage removes non-illuminated regions of the negative photoresist. A pattern formed in the negative photoresist is thus a negative of a pattern defined by opaque regions of a template, such as a mask, between the light source and the negative photoresist. In a positive photoresist, illuminated regions of the positive photoresist become soluble and are removed via application of a solvent during development. Thus, a pattern formed in the positive photoresist is a positive image of opaque regions of the template, such as a mask, between the light source and the positive photoresist. According to some embodiments, one or more etchants have a selectivity such that the one or more etchants remove or etch away one or more layers exposed or not covered by the photoresist at a greater rate than the one or more etchants remove or etch away the photoresist. In some embodiments, the one or more layers comprise the silicon nitride layer 302. In some embodiments, an opening in the photoresist allows the one or more etchants to form a corresponding opening in the one or more layers under the photoresist, and thereby transfer a pattern in the photoresist to the one or more layers under the photoresist. In some embodiments, the photoresist is removed after the pattern transfer, such as by at least one of chemical mechanical planarization (CMP), etching, or other suitable techniques. According to some embodiments, the photoresist is at least one of stripped or washed away using at least one of hydrogen fluoride (HF), diluted HF, a chlorine compound such as hydrogen chloride (HCl), hydrogen sulfide ($H_2S$), or other suitable material. Other processes and techniques for at least one of patterning the silicon nitride layer 302 or forming the one or more silicon nitride waveguides 402 are within the scope of the present disclosure.

According to some embodiments, an etching process used to remove portions of the silicon nitride layer 302 to expose portions of the second dielectric layer 202 and form the one or more silicon nitride waveguides 402 is at least one of a dry etching process, a wet etching process, an anisotropic etching process, an isotropic etching process, or another suitable process. According to some embodiments, the etching process uses at least one of HF, diluted HF, a chlorine compound such as HCl, $H_2S$, or other suitable material. Other processes and techniques for at least one of removing portions of the silicon nitride layer 302 to expose portions of the second dielectric layer 202 or forming the one or more silicon nitride waveguides 402 are within the scope of the present disclosure.

In some embodiments, a length 404 of a top surface of a silicon nitride waveguide 402 is about equal to a length 406 of a sidewall of the silicon nitride waveguide 402. In some embodiments, the length 404 of the top surface of the silicon nitride waveguide 402 is different than the length 406 of the sidewall of the silicon nitride waveguide 402. In some embodiments, the length 404 of the top surface of the silicon nitride waveguide 402 is between about 4,000 angstroms and about 10,000 angstroms. Other values of the length 404 of the top surface of the silicon nitride waveguide 402 are within the scope of the present disclosure. In some embodiments, the length 406 of the sidewall of the silicon nitride waveguide 402 is between about 4,000 angstroms and about 10,000 angstroms. Other values of the length 406 of the sidewall of the silicon nitride waveguide 402 are within the scope of the present disclosure.

In some embodiments, the one or more silicon nitride waveguides 402 are annealed in a second annealing process. In some embodiments, the second annealing process is performed to anneal the one or more silicon nitride waveguides 402 in addition, or as an alternative, to performing the first annealing process to anneal the silicon nitride layer 302. In some embodiments, the second annealing process comprises annealing the one or more silicon nitride waveguides 402 to at least one of reduce or remove hydrogen of the one or more silicon nitride waveguides 402. In some embodiments, the second annealing process comprises annealing the one or more silicon nitride waveguides 402 at a temperature of at least 1,000° C. or a temperature of at least 1,100° C. Other temperatures for performing the second annealing process are within the scope of the present disclosure. In some embodiments, the second annealing process comprises annealing the one or more silicon nitride waveguides 402 for a duration of time of at least 40 minutes or a duration of time of at least 60 minutes. Other durations of time for performing the second annealing process are within the scope of the present disclosure. In some embodiments, given that the one or more silicon nitride waveguides 402 are part of the semiconductor device 100, the second annealing process comprises annealing at least one of the one or more silicon nitride waveguides 402, the second dielectric layer 202, the semiconductor layer 106, or the one or more layers 108, such as at least one of the first dielectric layer 104 or the first substrate 102. Other processes, techniques, and parameters for annealing the one or more silicon nitride waveguides 402 are within the scope of the present disclosure.

In some embodiments, at least one of the removal of hydrogen or the reduction in hydrogen of the one or more silicon nitride waveguides 402 provides for reduced propagation loss of a signal, such as an optical signal, that is propagated via a silicon nitride waveguide 402. In some embodiments, a propagation loss corresponds to a loss, such as a path loss, of a signal per unit of distance. In some embodiments, the optical signal has a wavelength between about 1,500 nanometers and about 1,600 nanometers. In some embodiments, performing at least one of the first annealing process or the second annealing process causes a reduction of at least about 3 decibels per centimeter in propagation loss of the optical signal, such as having a wavelength between about 1,500 nanometers and about 1,600 nanometers. Other reductions in propagation loss and other wavelengths of the optical signal are within the scope of the present disclosure. In some embodiments, performing at least one of the first annealing process or the second annealing process causes a reduction in propagation loss of the optical signal, such as having a wavelength between about 1,500 nanometers and about 1,600 nanometers, from a propagation loss of about 5 decibels per centimeter without performing at least one of the first annealing process or the second annealing process to about 2 decibels per centimeter. Other reductions in propagation loss and other wavelengths of the optical signal are within the scope of the present disclosure. In some embodiments, performing at least one of the first annealing process or the second annealing process reduces propagation loss by around a factor of 10, such that propagation loss is around 10 times greater where at least one of the first annealing process or the second annealing process is not performed.

Figure 5:
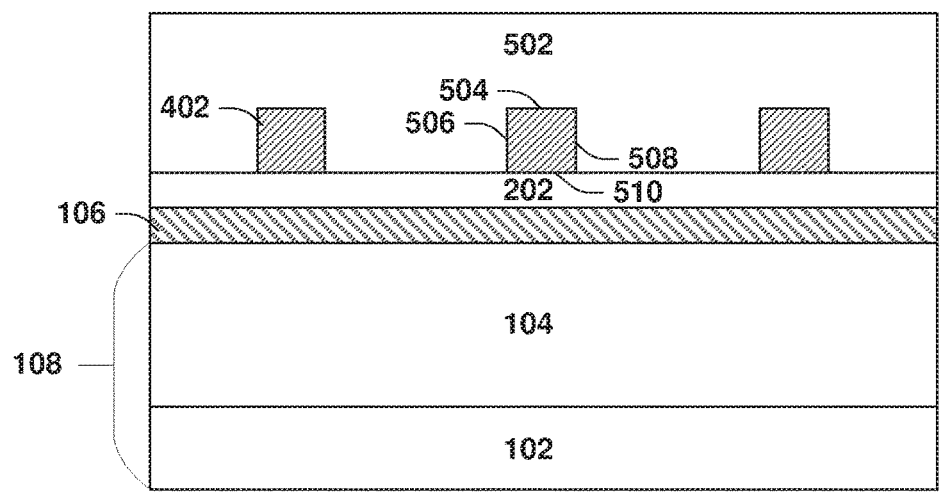

FIG. 5 illustrates a third dielectric layer 502 formed over at least one of the one or more silicon nitride waveguides 402 or the second dielectric layer 202, according to some embodiments. In some embodiments, the third dielectric layer 502 overlies at least one of the one or more silicon nitride waveguides 402 or the second dielectric layer 202. In some embodiments, the third dielectric layer 502 is in direct contact with the top surface of the second dielectric layer 202. In some embodiments, the third dielectric layer 502 is different than the second dielectric layer 202, such as having a different material composition, such that an interface is defined between the third dielectric layer 502 and the second dielectric layer 202. In some embodiments, the third dielectric layer 502 does not have a material composition different than the second dielectric layer 202. In some embodiments, the third dielectric layer 502 comprises at least one of silicon, nitride, oxide, such as $SiO_2$, or other suitable material. The third dielectric layer 502 is formed by at least one of PVD, sputtering, CVD, LPCVD, ALCVD, UHVCVD, RPCVD, ALD, MBE, LPE, spin on, growth, or other suitable techniques.

In some embodiments, the third dielectric layer 502 is in direct contact with one or more top surfaces of the one or more silicon nitride waveguides 402. In some embodiments, the third dielectric layer 502 is in direct contact with sidewalls of the one or more silicon nitride waveguides 402. In some embodiments, a bottom surface 510 of a silicon nitride waveguide 402 is at least one of in direct contact with or adjacent to the second dielectric layer 202. In some embodiments, a first sidewall 506 of the silicon nitride waveguide 402 is at least one of in direct contact with or adjacent to a sidewall of the third dielectric layer 502. In some embodiments, a second sidewall 508 of the silicon nitride waveguide 402 is at least one of in direct contact with or adjacent to a sidewall of the third dielectric layer 502. In some embodiments, a top surface 504 of the silicon nitride waveguide 402 is at least one of in direct contact with or adjacent to the third dielectric layer 502. In some embodiments where there are two or more silicon nitride waveguides 402, a portion of the third dielectric layer 502 separates a first silicon nitride waveguide 402 from a second silicon nitride waveguide 402. Other structures and configurations of the third dielectric layer 502 are within the scope of the present disclosure.

In some embodiments, a top surface of the third dielectric layer 502 is at least one of smoothed or planarized, such as by at least one of CMP, etching, or other suitable techniques. According to some embodiments, a portion of the third dielectric layer 502 is removed, such as by at least one of CMP, etching, or other suitable techniques. According to some embodiments, the top surface of the third dielectric layer 502 is made substantially planar when the portion of the third dielectric layer 502 is removed. Other processes and techniques for forming the third dielectric layer 502 are within the scope of the present disclosure.

Figure 6:
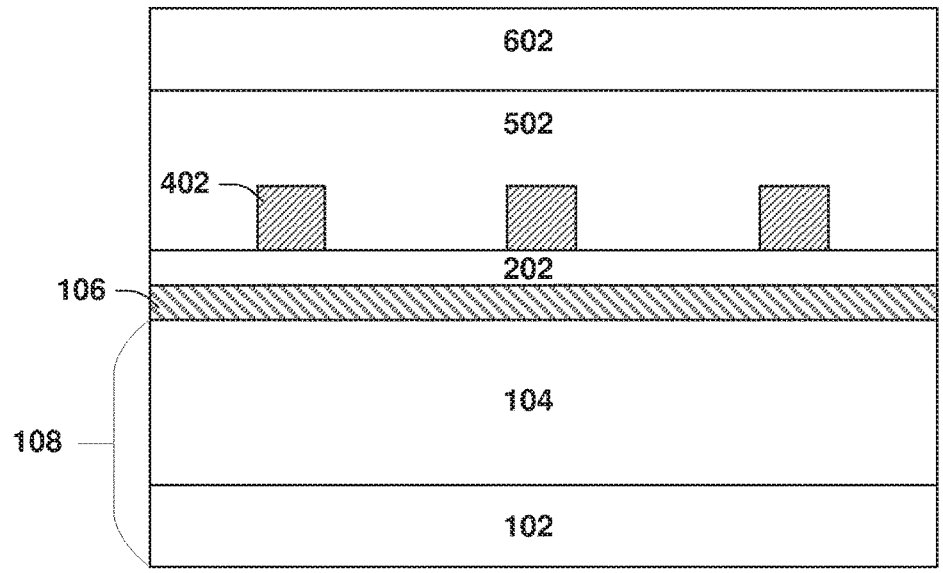

FIG. 6 illustrates a second substrate 602 formed over the third dielectric layer 502, according to some embodiments. In some embodiments, the second substrate 602 overlies the third dielectric layer 502. In some embodiments, the second substrate 602 is in direct contact with the top surface of the third dielectric layer 502. The second substrate 602 comprises at least one of an epitaxial layer, a SOI structure, a wafer, or a die formed from a wafer. Other structures and configurations of the second substrate 602 are within the scope of the present disclosure. The second substrate 602 comprises at least one of silicon, germanium, carbide, arsenide, gallium, arsenic, phosphide, indium, antimonide, SiGe, SiC, GaAs, GaN, GaP, InGaP, InP, InAs, InSb, GaAsP, AlInAs, AlGaAs, GaInAs, GaInP, GaInAsP, or other suitable material. According to some embodiments, the second substrate 602 comprises monocrystalline silicon, crystalline silicon with a <100> crystallographic orientation, crystalline silicon with a <110> crystallographic orientation, or other suitable material. In some embodiments, the second substrate 602 comprises at least one doped region.

In some embodiments, the second substrate 602 is bonded with the third dielectric layer 502, such as by at least one of an adhesive, one or more bonding layers, a bonding process, or other suitable techniques. In some embodiments where the second substrate 602 is bonded with the third dielectric layer 502 using the one or more bonding layers, the one or more bonding layers are between the second substrate 602 and the third dielectric layer 502. Other processes and techniques for forming the second substrate 602 are within the scope of the present disclosure.

Figure 7:
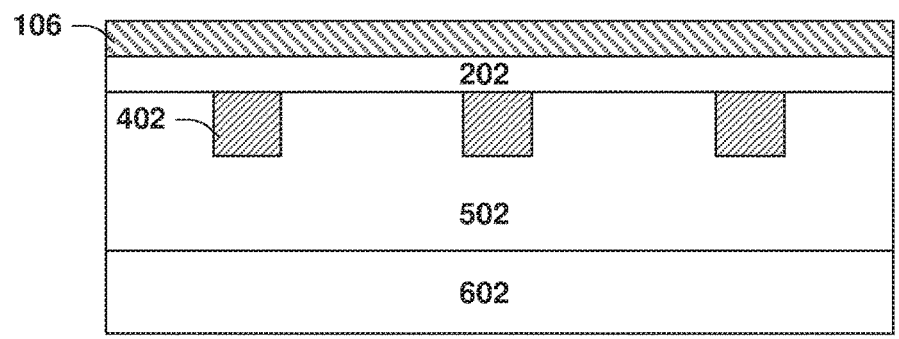

FIG. 7 illustrates removal of the one or more layers 108, according to some embodiments. In some embodiments, an inversion operation is performed such that the second substrate 602 is the bottommost layer of the semiconductor device 100 and such that the one or more layers 108, such as at least one of the first substrate 102, the first dielectric layer 104, or a different layer, are over the semiconductor layer 106. In some embodiments, the one or more layers 108 are removed, such as by at least one of CMP, etching, or other suitable techniques, after the inversion operation is performed. The one or more layers 108 are removed to expose the semiconductor layer 106.

Figure 8:
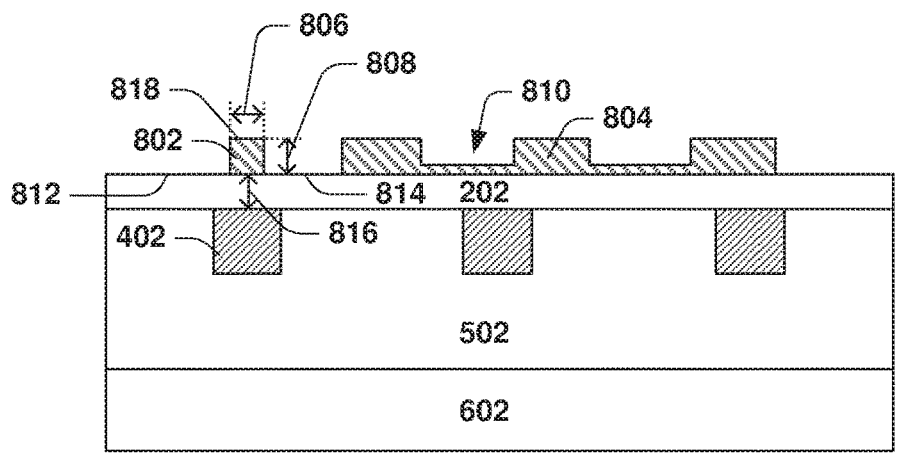

FIG. 8 illustrates a semiconductor waveguide 802 formed over the second dielectric layer 202, according to some embodiments. In some embodiments, the semiconductor waveguide 802 overlies a silicon nitride waveguide 402. Even though one semiconductor waveguide 802 is depicted, any number of semiconductor waveguides 802 are contemplated. In some embodiments, a modulator structure 804 is formed over the second dielectric layer 202. In some embodiments, the modulator structure 804 is formed by at least one of an ion metal plasma (IMP) process or another suitable technique.

In some embodiments, the semiconductor layer 106 is patterned to form at least one of the semiconductor waveguide 802 or the modulator structure 804. In some embodiments, the semiconductor layer 106 is treated, such as having features, elements, etc. selectively formed therein, having dopants selectively implanted therein, etc., at least one of before or after being patterned. In some embodiments, the semiconductor layer 106 is treated prior to at least one of the aforementioned first annealing process or the second annealing process. In some embodiments, the semiconductor layer 106 is patterned to expose a top surface of the second dielectric layer 202, such as to expose at least one of a first portion 812 of the top surface of the second dielectric layer 202 or a second portion 814 of the top surface of the second dielectric layer 202. In some embodiments, the first portion 812 of the top surface of the second dielectric layer 202 and the second portion 814 of the top surface of the second dielectric layer 202 are laterally offset from the semiconductor waveguide 802. In some embodiments, the semiconductor layer 106 is patterned to form one or more trenches 810 defined in the modulator structure 804.

In some embodiments, the semiconductor layer 106 is patterned to form at least one of the semiconductor waveguide 802 or the modulator structure 804 using a photoresist (not shown). In some embodiments, the photoresist is formed over the semiconductor layer 106. The photoresist is formed by at least one of PVD, sputtering, CVD, LPCVD, ALCVD, UHVCVD, RPCVD, ALD, MBE, LPE, spin on, growth, or other suitable techniques. The photoresist comprises a light-sensitive material, where properties, such as solubility, of the photoresist are affected by light. The photoresist is a negative photoresist or a positive photoresist.

According to some embodiments, one or more etchants have a selectivity such that the one or more etchants remove or etch away one or more layers exposed or not covered by the photoresist at a greater rate than the one or more etchants remove or etch away the photoresist. In some embodiments, the one or more layers comprise the semiconductor layer 106. In some embodiments, an opening in the photoresist allows the one or more etchants to form a corresponding opening and/or a trench in the one or more layers under the photoresist, and thereby transfer a pattern in the photoresist to the one or more layers under the photoresist. In some embodiments, the photoresist is removed after the pattern transfer, such as by at least one of CMP, etching, or other suitable techniques. According to some embodiments, the photoresist is at least one of stripped or washed away using at least one of HF, diluted HF, a chlorine compound such as HCl, $H_2S$, or other suitable material. Other processes and techniques for at least one of patterning the semiconductor layer 106, forming the semiconductor waveguide 802, or forming the modulator structure 804 are within the scope of the present disclosure.

According to some embodiments, an etching process used to remove portions of the semiconductor layer 106 to at least one of expose portions of the second dielectric layer 202, form the semiconductor waveguide 802, form the one or more trenches 810, or form the modulator structure 804, is at least one of a dry etching process, a wet etching process, an anisotropic etching process, an isotropic etching process, or another suitable process. According to some embodiments, the etching process uses at least one of HF, diluted HF, a chlorine compound such as HCl, $H_2S$, or other suitable material. Other processes and techniques for at least one of removing portions of the semiconductor layer 106, exposing portions of the second dielectric layer 202, forming the semiconductor waveguide 802, forming the one or more trenches 810, or forming the modulator structure 804 are within the scope of the present disclosure.

In some embodiments, a length 806 of a top surface 818 of the semiconductor waveguide 802 is about equal to a length 808 of a sidewall of the semiconductor waveguide 802. In some embodiments, the length 806 of the top surface 818 of the semiconductor waveguide 802 is different than the length 808 of the sidewall of the semiconductor waveguide 802. In some embodiments, the length 806 of the top surface 818 of the semiconductor waveguide 802 is between about 2,000 angstroms and about 4,000 angstroms. Other values of the length 806 of the top surface 818 of the semiconductor waveguide 802 are within the scope of the present disclosure. In some embodiments, the length 808 of the sidewall of the semiconductor waveguide 802 is between about 2,000 angstroms and about 4,000 angstroms. Other values of the length 808 of the sidewall of the semiconductor waveguide 802 are within the scope of the present disclosure. In some embodiments, a distance 816 between the semiconductor waveguide 802 and a silicon nitride waveguide 402 underlying the semiconductor waveguide 802 is between about 1,000 angstroms and about 5,000 angstroms. Other values of the distance 816 between the semiconductor waveguide 802 and the silicon nitride waveguide 402 are within the scope of the present disclosure.

Figure 9:
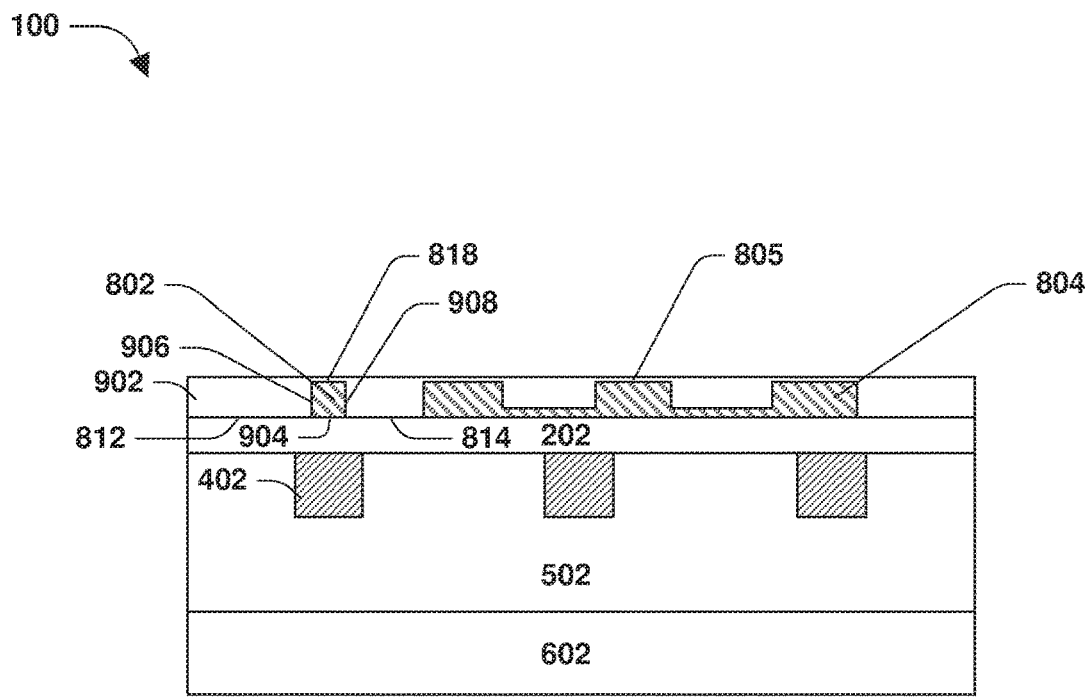

FIG. 9 illustrates a fourth dielectric layer 902 formed over at least one of the semiconductor waveguide 802, the modulator structure 804, or the second dielectric layer 202, according to some embodiments. In some embodiments, the fourth dielectric layer 902 overlies at least one of the semiconductor waveguide 802, the modulator structure 804, or the second dielectric layer 202. In some embodiments, the fourth dielectric layer 902 is in direct contact with one or more portions of the top surface of the second dielectric layer 202, such as the first portion 812 of the top surface of the second dielectric layer 202 and the second portion 814 of the top surface of the second dielectric layer 202. In some embodiments, the fourth dielectric layer 902 is different than the second dielectric layer 202, such as having a different material composition, such that an interface is defined between the fourth dielectric layer 902 and the second dielectric layer 202. In some embodiments, the fourth dielectric layer 902 does not have a material composition different than the second dielectric layer 202. In some embodiments, the fourth dielectric layer 902 comprises at least one of silicon, nitride, oxide, such as $SiO_2$, or other suitable material. The fourth dielectric layer 902 is formed by at least one of PVD, sputtering, CVD, LPCVD, ALCVD, UHVCVD, RPCVD, ALD, MBE, LPE, spin on, growth, or other suitable techniques.

In some embodiments, the fourth dielectric layer 902 is in direct contact with at least one of the top surface 818 of the semiconductor waveguide 802 or a top surface 805 of the modulator structure 804. According to some embodiments, a top surface of the fourth dielectric layer 902 and the top surface 818 of the semiconductor waveguide 802 are substantially coplanar. According to some embodiments, the top surface of the fourth dielectric layer 902 and the top surface 805 of the modulator structure 804 are substantially coplanar. In some embodiments, the fourth dielectric layer 902 is in direct contact with at least one of sidewalls of the semiconductor waveguide 802 or sidewalls of the modulator structure 804. In some embodiments, a bottom surface 904 of the semiconductor waveguide 802 is at least one of in direct contact with or adjacent to the second dielectric layer 202. In some embodiments, a bottom surface of the modulator structure 804 is at least one of in direct contact with or adjacent to the second dielectric layer 202. In some embodiments, a first sidewall 906 of the semiconductor waveguide 802 is at least one of in direct contact with or adjacent to a sidewall of the fourth dielectric layer 902. In some embodiments, a second sidewall 908 of the semiconductor waveguide 802 is at least one of in direct contact with or adjacent to a sidewall of the fourth dielectric layer 902. In some embodiments, a sidewall of the fourth dielectric layer 902 is at least one of in direct contact with or adjacent to the modulator structure 804. In some embodiments, a portion of the fourth dielectric layer 902 separates the semiconductor waveguide 802 from the modulator structure 804. In some embodiments, a portion of the fourth dielectric layer 902 at least one of overlies or is in direct contact with at least one of the top surface 818 of the semiconductor waveguide 802 or the top surface 805 of the modulator structure 804. Other structures and configurations of the fourth dielectric layer 902, the semiconductor waveguide 802, the second dielectric layer 202, and the modulator structure 804 are within the scope of the present disclosure.

Figure 10:
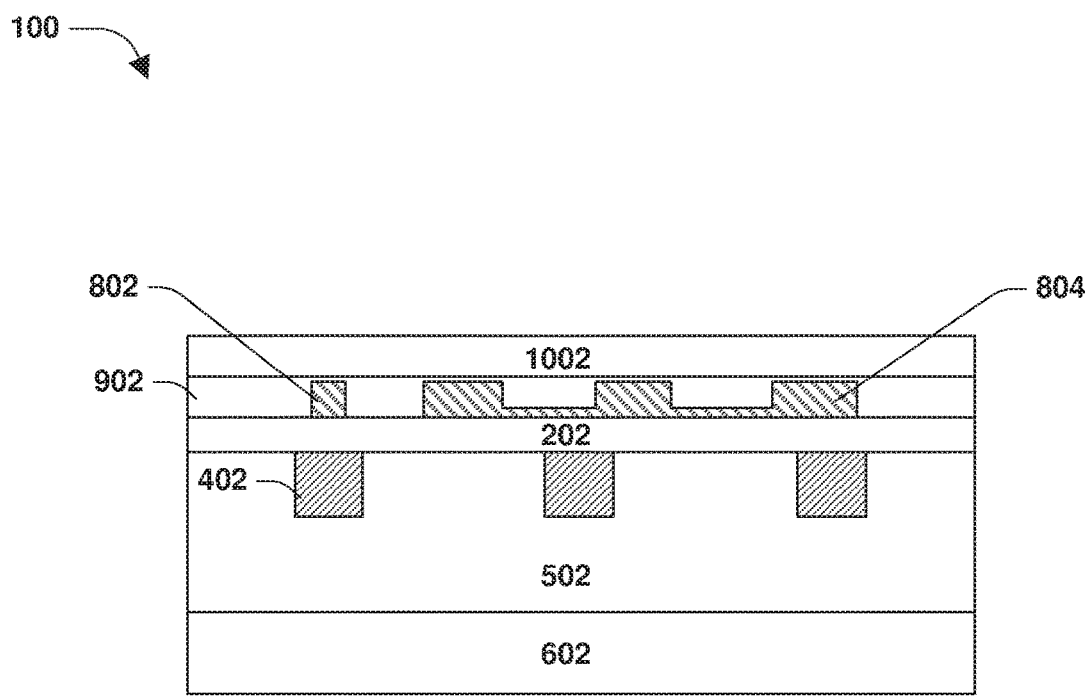

FIG. 10 illustrates a fifth dielectric layer 1002 formed over the fourth dielectric layer 902, according to some embodiments. In some embodiments, the fifth dielectric layer 1002 overlies the fourth dielectric layer 902. In some embodiments, the fifth dielectric layer 1002 is in direct contact with the top surface of the fourth dielectric layer 902. In some embodiments, the fifth dielectric layer 1002 is different than the fourth dielectric layer 902, such as having a different material composition, such that an interface is defined between the fifth dielectric layer 1002 and the fourth dielectric layer 902. In some embodiments, the fifth dielectric layer 1002 comprises at least one of silicon, nitride, oxide, such as $SiO_2$, or other suitable material. The fifth dielectric layer 1002 is formed by at least one of PVD, sputtering, CVD, LPCVD, ALCVD, UHVCVD, RPCVD, ALD, MBE, LPE, spin on, growth, or other suitable techniques. In some embodiments, the fifth dielectric layer 1002 is an interlevel dielectric (ILD). Other structures and configurations of the fifth dielectric layer 1002 are within the scope of the present disclosure.

Figure 11:
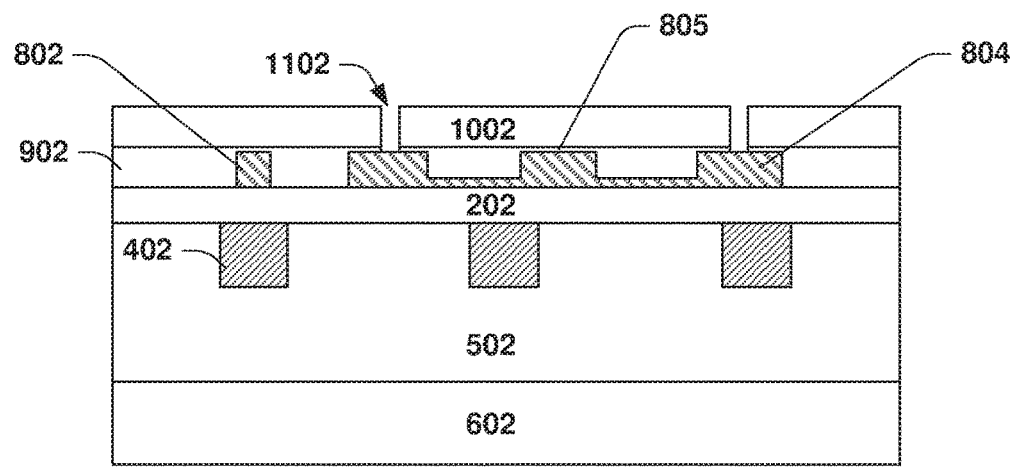

FIG. 11 illustrates one or more first openings 1102 formed in at least one of the fifth dielectric layer 1002 or the fourth dielectric layer 902, according to some embodiments. In some embodiments, the one or more first openings 1102 expose the top surface 805 of the modulator structure 804. In some embodiments, a portion of the fifth dielectric layer 1002 is removed to form an opening of the one or more first openings 1102. In some embodiments where a portion of the fourth dielectric layer 902 at least one of overlies or is in direct contact with the top surface 805 of the modulator structure 804, a portion of the fourth dielectric layer 902 is removed to form an opening of the one or more first openings 1102. Other structures and configurations of the one or more first openings 1102 are within the scope of the present disclosure.

In some embodiments, at least one of the fifth dielectric layer 1002 or the fourth dielectric layer 902 are patterned to form the one or more first openings 1102 using a photoresist (not shown). In some embodiments, the photoresist is formed over the fifth dielectric layer 1002. The photoresist is formed by at least one of PVD, sputtering, CVD, LPCVD, ALCVD, UHVCVD, RPCVD, ALD, MBE, LPE, spin on, growth, or other suitable techniques. The photoresist comprises a light-sensitive material, where properties, such as solubility, of the photoresist are affected by light. The photoresist is a negative photoresist or a positive photoresist.

According to some embodiments, one or more etchants have a selectivity such that the one or more etchants remove or etch away one or more layers exposed or not covered by the photoresist at a greater rate than the one or more etchants remove or etch away the photoresist. In some embodiments, the one or more layers comprise at least one of the fifth dielectric layer 1002 or the fourth dielectric layer 902. In some embodiments, an opening in the photoresist allows the one or more etchants to form a corresponding opening, such as an opening of the one or more first openings 1102, in the one or more layers under the photoresist, and thereby transfer a pattern in the photoresist to the one or more layers under the photoresist. In some embodiments, the photoresist is removed after the pattern transfer, such as by at least one of CMP, etching, or other suitable techniques. According to some embodiments, the photoresist is at least one of stripped or washed away using at least one of HF, diluted HF, a chlorine compound such as HCl, $H_2S$, or other suitable material. Other processes and techniques for forming the one or more first openings 1102 are within the scope of the present disclosure.

According to some embodiments, an etching process used to form the one or more first openings 1102 is at least one of a dry etching process, a wet etching process, an anisotropic etching process, an isotropic etching process, or another suitable process. According to some embodiments, the etching process uses at least one of HF, diluted HF, a chlorine compound such as HCl, $H_2S$, or other suitable material. Other processes and techniques for forming the one or more first openings 1102 are within the scope of the present disclosure.

Figure 12:
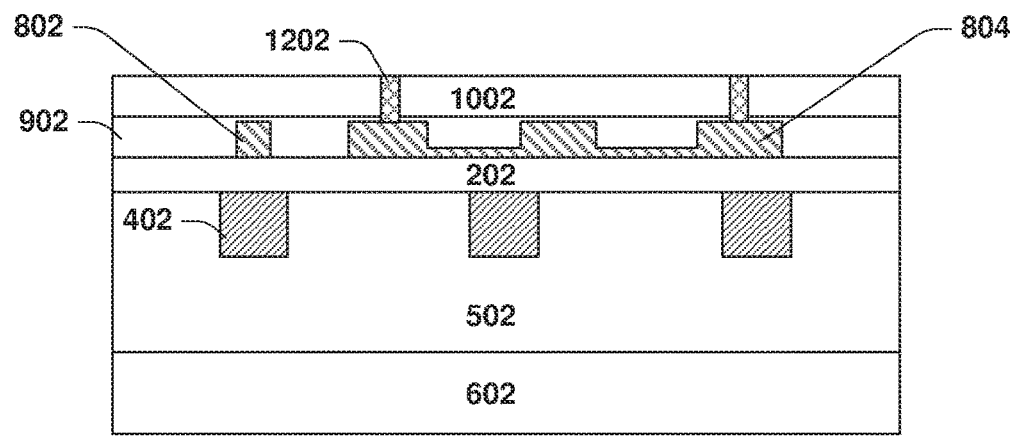

FIG. 12 illustrates one or more first conductive structures 1202 formed in at least one of the first openings 1102 in at least one of the fifth dielectric layer 1002 or the fourth dielectric layer 902, according to some embodiments. In some embodiments, the one or more first conductive structures 1202 overlie the modulator structure 804. In some embodiments, the one or more first conductive structures 1202 are in direct contact with the modulator structure 804. According to some embodiments, the one or more first conductive structures 1202 comprise a conductive material, such as a metal material, such as copper, or other suitable material. The one or more first conductive structures 1202 are formed by at least one of PVD, sputtering, CVD, LPCVD, ALCVD, UHVCVD, RPCVD, ALD, MBE, LPE, spin on, growth, or other suitable techniques. Even though two conductive structures of the one or more first conductive structures 1202 are depicted, any number of conductive structures of the one or more first conductive structures 1202 are contemplated.

Figure 13:
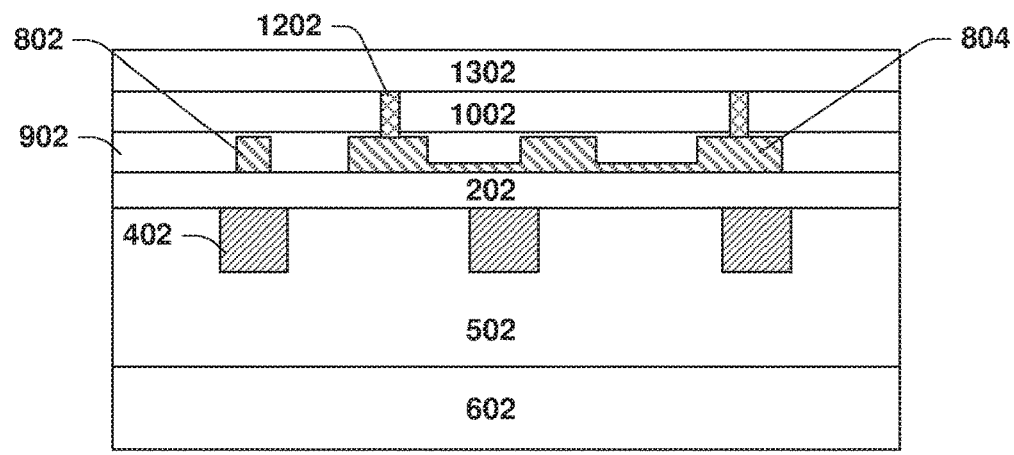

FIG. 13 illustrates a sixth dielectric layer 1302 formed over the fifth dielectric layer 1002, according to some embodiments. In some embodiments, the sixth dielectric layer 1302 overlies the fifth dielectric layer 1002. In some embodiments, the sixth dielectric layer 1302 is in direct contact with a top surface of the fifth dielectric layer 1002. In some embodiments, the sixth dielectric layer 1302 is different than the fifth dielectric layer 1002, such as having a different material composition, such that an interface is defined between the sixth dielectric layer 1302 and the fifth dielectric layer 1002. In some embodiments, the sixth dielectric layer 1302 does not have a material composition different than the fifth dielectric layer 1002. In some embodiments, the sixth dielectric layer 1302 comprises at least one of silicon, nitride, oxide, such as $SiO_2$, or other suitable material. The sixth dielectric layer 1302 is formed by at least one of PVD, sputtering, CVD, LPCVD, ALCVD, UHVCVD, RPCVD, ALD, MBE, LPE, spin on, growth, or other suitable techniques. In some embodiments, the sixth dielectric layer 1302 is an intermetal dielectric (IMD). Other structures and configurations of the sixth dielectric layer 1302 are within the scope of the present disclosure.

Figure 14:
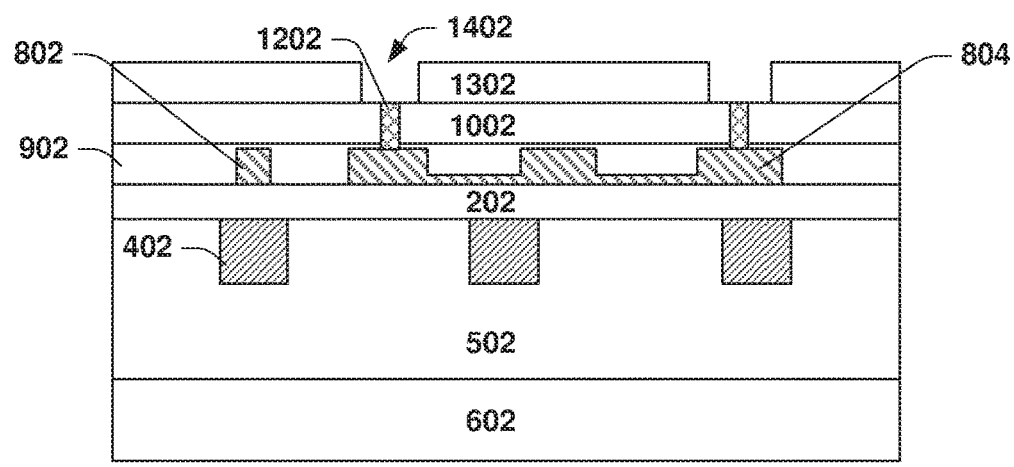

FIG. 14 illustrates one or more trenches 1402 formed in the sixth dielectric layer 1302, according to some embodiments. In some embodiments, the one or more trenches 1402 expose the one or more first conductive structures 1202. In some embodiments, a portion of the sixth dielectric layer 1302 is removed to form a trench of the one or more trenches 1402. Other structures and configurations of the one or more trenches 1402 are within the scope of the present disclosure.

In some embodiments, the sixth dielectric layer 1302 is patterned to form the one or more trenches 1402 using a photoresist (not shown). In some embodiments, the photoresist is formed over the sixth dielectric layer 1302. The photoresist is formed by at least one of PVD, sputtering, CVD, LPCVD, ALCVD, UHVCVD, RPCVD, ALD, MBE, LPE, spin on, growth, or other suitable techniques. The photoresist comprises a light-sensitive material, where properties, such as solubility, of the photoresist are affected by light. The photoresist is a negative photoresist or a positive photoresist.

According to some embodiments, one or more etchants have a selectivity such that the one or more etchants remove or etch away one or more layers exposed or not covered by the photoresist at a greater rate than the one or more etchants remove or etch away the photoresist. In some embodiments, the one or more layers comprise the sixth dielectric layer 1302. In some embodiments, an opening in the photoresist allows the one or more etchants to form a corresponding opening, such as a trench 1402, in the one or more layers under the photoresist, and thereby transfer a pattern in the photoresist to the one or more layers under the photoresist. In some embodiments, the photoresist is removed after the pattern transfer, such as by at least one of CMP, etching, or other suitable techniques. According to some embodiments, the photoresist is at least one of stripped or washed away using at least one of HF, diluted HF, a chlorine compound such as HCl, $H_2S$, or other suitable material. Other processes and techniques for forming the one or more trenches 1402 are within the scope of the present disclosure.

According to some embodiments, an etching process used to form the one or more trenches 1402 is at least one of a dry etching process, a wet etching process, an anisotropic etching process, an isotropic etching process, or another suitable process. According to some embodiments, the etching process uses at least one of HF, diluted HF, a chlorine compound such as HCl, $H_2S$, or other suitable material. Other processes and techniques for forming the one or more trenches 1402 are within the scope of the present disclosure.

Figure 15:
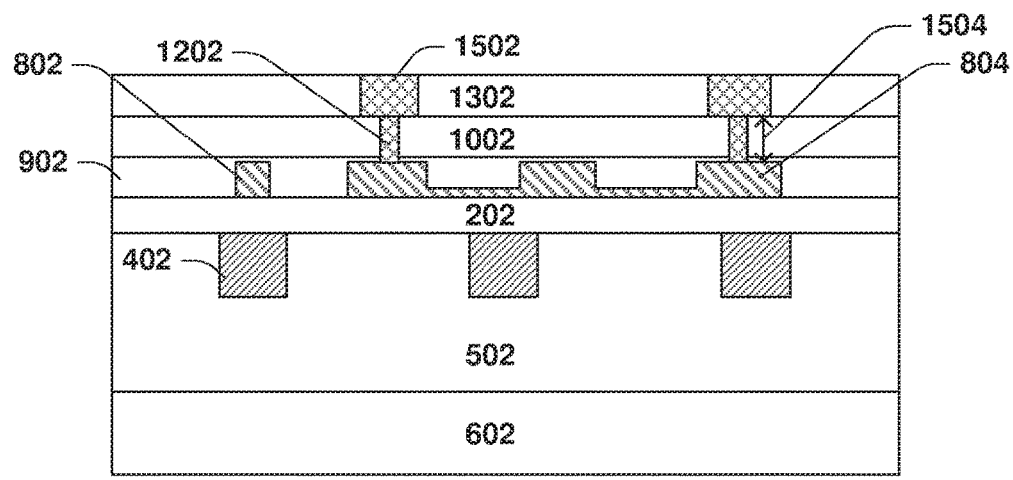

FIG. 15 illustrates one or more second conductive structures 1502 formed in at least one of the trenches 1402 in the sixth dielectric layer 1302, according to some embodiments. In some embodiments, the one or more second conductive structures 1502 overlie at least one of the one or more first conductive structures 1202 or the modulator structure 804. In some embodiments, the one or more second conductive structures 1502 are in direct contact with the one or more first conductive structures 1202. According to some embodiments, the one or more second conductive structures 1502 comprise a conductive material, such as a metal material, such as copper, or other suitable material. The one or more second conductive structures 1502 are formed by at least one of PVD, sputtering, CVD, LPCVD, ALCVD, UHVCVD, RPCVD, ALD, MBE, LPE, spin on, growth, or other suitable techniques. Even though two conductive structures of the one or more second conductive structures 1502 are depicted, any number of conductive structures of the one or more second conductive structures 1502 are contemplated.

According to some embodiments, the one or more first conductive structures 1202 and the one or more second conductive structures 1502 are formed by a dual damascene process. The fifth dielectric layer 1002 is formed over the fourth dielectric layer 902. The sixth dielectric layer 1302 is formed over the fifth dielectric layer 1002. One or more openings are formed in at least one of the sixth dielectric layer 1302, the fifth dielectric layer 1002 or the fourth dielectric layer 902. The one or more openings expose the top surface of the modulator structure 804. One or more trenches are formed in the sixth dielectric layer 1302. In some embodiments, a trench of the one or more trenches is wider than an opening of the one or more openings. A trench is formed in the sixth dielectric layer 1302 by removing a portion of the sixth dielectric layer 1302 that is adjacent to or overlies an opening of the one or more openings. The one or more first conductive structures 1202 and the one or more second conductive structures 1502 are formed in the one or more openings and the one or more trenches, such as by depositing conductive material in the one or more openings and the one or more trenches. The one or more first conductive structures 1202 and the one or more second conductive structures 1502 are formed by at least one of PVD, sputtering, CVD, LPCVD, ALCVD, UHVCVD, RPCVD, ALD, MBE, LPE, spin on, growth, or other suitable techniques. In some embodiments, at least some of the one or more first conductive structures 1202 are formed concurrently with or during a same process as formation of at least some of the one or more second conductive structures 1502. In some embodiments, at least some of the one or more first conductive structures 1202 are not formed concurrently with or during a same process as formation of at least some of the one or more second conductive structures 1502. In some embodiments, at least some of the one or more first conductive structures 1202 have a same material composition as at least some of the one or more second conductive structures 1502. In some embodiments, at least some of the one or more first conductive structures 1202 do not have a same material composition as at least some of the one or more second conductive structures 1502. Other processes and techniques for forming the one or more first conductive structures 1202 and the one or more second conductive structures 1502 are within the scope of the present disclosure.

In some embodiments, the one or more first conductive structures 1202 are one or more vias. Other structures and configurations of one or more first conductive structures 1202 are within the scope of the present disclosure. In some embodiments, the one or more second conductive structures 1502 are at least one of one or more metal contacts, one or more metal pads, or one or more metal terminals. Other structures and configurations of one or more second conductive structures 1502 are within the scope of the present disclosure. In some embodiments, the one or more second conductive structures 1502 are connected to at least one of various doped features, circuitry, input/output, etc. of the semiconductor device 100.

In some embodiments, an electrical signal is transmitted to the modulator structure 804 via a conductive structure of the one or more second conductive structures 1502 and a corresponding conductive structure of the one or more first conductive structures 1202. Other structures, configurations, and techniques for transmitting the electrical signal to the modulator structure 804 are within the scope of the present disclosure. In some embodiments, the electrical signal is converted, such as by at least one of the modulator structure 804 or the semiconductor waveguide 802, to an optical signal. In some embodiments, the optical signal is propagated via at least one of the semiconductor waveguide 802 or a silicon nitride waveguide 402 underlying the semiconductor waveguide 802.

In some embodiments, the optical signal is propagated via at least some of the semiconductor waveguide 802. In some embodiments, the semiconductor waveguide 802 is surrounded by material, such as portions of at least one of the fifth dielectric layer 1002, the fourth dielectric layer 902, or the second dielectric layer 202, having a refractive index less than a refractive index of the semiconductor waveguide 802.

Other structures, configurations, and techniques for propagating the optical signal via the semiconductor waveguide 802 are within the scope of the present disclosure. In some embodiments, such as where at least one of the fifth dielectric layer 1002, the fourth dielectric layer 902, or the second dielectric layer 202 comprise $SiO_2$, the refractive index of the material surrounding the semiconductor waveguide 802 is between about 1.4 and about 1.6. Other materials surrounding the semiconductor waveguide 802 and other refractive indexes are within the scope of the present disclosure. In some embodiments, such as where the semiconductor waveguide 802 is a silicon waveguide, the refractive index of the semiconductor waveguide 802 is between about 3.3 and about 3.7. Other materials and refractive indexes of the semiconductor waveguide 802 are within the scope of the present disclosure. In some embodiments, at least one of the semiconductor waveguide 802 or the material surrounding the semiconductor waveguide 802 are configured to guide the optical signal into or through the semiconductor waveguide 802. The refractive index of the material surrounding the semiconductor waveguide 802 being less than the refractive index of the semiconductor waveguide 802 provides for at least some radiation of the optical signal being reflected by the material surrounding the semiconductor waveguide 802 such that the radiation at least one of remains within the semiconductor waveguide 802 or is inhibited from exiting from the semiconductor waveguide 802 so as to be propagated via the semiconductor waveguide 802.

In some embodiments, the optical signal is transferred from the semiconductor waveguide 802 to the silicon nitride waveguide 402. According to some embodiments, the semiconductor waveguide 802 decreases in size or tapers in a direction that the optical signal is propagated. In some embodiments, the optical signal is transferred from the semiconductor waveguide 802 to the silicon nitride waveguide 402 by traveling through the second dielectric layer 202 as a result of the optical signal reaching a portion of the semiconductor waveguide 802 that is less than a threshold size. Other structures, configurations, and techniques for transferring the optical signal from the semiconductor waveguide 802 to the silicon nitride waveguide 402 are within the scope of the present disclosure. In some embodiments, the optical signal is propagated via at least some of the silicon nitride waveguide 402. In some embodiments, the silicon nitride waveguide 402 is surrounded by material, such as portions of at least one of the third dielectric layer 502 or the second dielectric layer 202, having a refractive index less than a refractive index of the silicon nitride waveguide 402. Other structures, configurations, and techniques for propagating the optical signal via the silicon nitride waveguide 402 are within the scope of the present disclosure. In some embodiments, such as where at least one of the third dielectric layer 502 or the second dielectric layer 202 comprise $SiO_2$, the refractive index of the material surrounding the silicon nitride waveguide 402 is between about 1.4 and about 1.6. Other materials surrounding the silicon nitride waveguide 402 and other refractive indexes are within the scope of the present disclosure. In some embodiments, the refractive index of the silicon nitride waveguide 402 is between about 1.8 and about 2.2. Other materials and refractive indexes of the silicon nitride waveguide 402 are within the scope of the present disclosure. In some embodiments, at least one of the silicon nitride waveguide 402 or the material surrounding the silicon nitride waveguide 402 are configured to guide the optical signal into or through the silicon nitride waveguide 402. The refractive index of the material surrounding the silicon nitride waveguide 402 being less than the refractive index of the silicon nitride waveguide 402 provides for at least some radiation of the optical signal being reflected by the material surrounding the silicon nitride waveguide 402 such that the radiation at least one of remains within the silicon nitride waveguide 402 or is inhibited from exiting from the silicon nitride waveguide 402 so as to be propagated via the silicon nitride waveguide 402. In some embodiments, the optical signal is propagated via the silicon nitride waveguide 402 with a lower propagation loss than a propagation loss of the optical signal being propagated via the semiconductor waveguide 802. In some embodiments, the optical signal is propagated via the semiconductor waveguide 802 with a propagation loss at least 8 times greater than a propagation loss of the optical signal being propagated via the silicon nitride waveguide 402. Other propagation losses of the optical signal propagated via the silicon nitride waveguide 402 and the semiconductor waveguide 802 are within the scope of the present disclosure.

In some embodiments, a distance 1504 between a second conductive structure 1502 and the modulator structure 804 is reduced as a result of the modulator structure 804 being in the fourth dielectric layer 902 between the one or more silicon nitride waveguides 402 and the one or more second conductive structures 1502, in comparison with some semiconductor devices having a silicon nitride waveguide over a modulator structure. In some embodiments, forming the semiconductor device 100 such that the modulator structure 804 is in the fourth dielectric layer 902 between the one or more silicon nitride waveguides 402 and the one or more second conductive structures 1502 provides for a reduction in the distance 1504, from about 9,000 angstroms in semiconductor devices having a silicon nitride waveguide over a modulator structure, to about 3,100 angstroms. Other values of the distance 1504 are within the scope of the present disclosure. The reduced distance 1504 provides for transmission of the electrical signal, from the second conductive structure 1502 to the modulator structure 804, with a reduced amount of signal loss.

In some embodiments, performing at least one of the first annealing process or the second annealing process provides for improved propagation of the optical signal, such as having a wavelength between about 1,500 nanometers and about 1,600 nanometers, via the silicon nitride waveguide 402. Other wavelengths of the optical signal are within the scope of the present disclosure. In some embodiments, performing at least one of the first annealing process or the second annealing process enables the semiconductor device 100 to propagate the optical signal having a wavelength between about 1,500 nanometers and about 1,600 nanometers via the silicon nitride waveguide 402. Other wavelengths of the optical signal are within the scope of the present disclosure. In some embodiments, some semiconductor devices with silicon nitride waveguides formed without performing the first annealing process or the second annealing process are limited to propagating signals with wavelengths less than about 1,400 nanometers, such as signals having a wavelength of about 1,310 nanometers.

In some embodiments, performing an annealing process on a semiconductor device can cause affect at least one of components or circuitry of the semiconductor device. At least one of forming the one or more silicon nitride waveguides 402 or annealing the one or more silicon nitride waveguides 402 prior to forming at least one of the second substrate 602, the modulator structure 804, or the semiconductor waveguide 802 provides for the one or more silicon nitride waveguides 402 being annealed without affecting at least one of the second substrate 602, the modulator structure 804, or the semiconductor waveguide 802, such as at least one of activating, migrating, etc. dopants, melting materials, etc. in at least one of the second substrate 602, the modulator structure 804, or the semiconductor waveguide 802. In some embodiments, at least one of forming the one or more silicon nitride waveguides 402 or annealing the one or more silicon nitride waveguides 402 prior to forming at least one of the second substrate 602, the modulator structure 804, or the semiconductor waveguide 802 enables the semiconductor device 100 to propagate an optical signal having a wavelength between about 1,500 nanometers and about 1,600 nanometers via a silicon nitride waveguide 402. Other wavelengths of the optical signal are within the scope of the present disclosure. In some embodiments, at least one of forming the one or more silicon nitride waveguides 402 or annealing the one or more silicon nitride waveguides 402 prior to forming at least one of the second substrate 602, the modulator structure 804, or the semiconductor waveguide 802 provides for the semiconductor device 100 propagating an optical signal having a wavelength between about 1,500 nanometers and about 1,600 nanometers via a silicon nitride waveguide 402 with a reduced propagation loss. Other wavelengths of the optical signal are within the scope of the present disclosure.

FIGS. 16-29 are cross-sectional views of a semiconductor device 1600, in accordance with some embodiments. In some embodiments, the semiconductor device 1600 comprises a communication device, such as a transceiver. According to some embodiments, the semiconductor device 1600 comprises a photonic device, such as a silicon-based photonic IC. In some embodiments, the semiconductor device 1600 is configured for optical communication, such as transmission of an optical signal. Other structures and configurations of the semiconductor device 1600 are within the scope of the present disclosure.

Figure 16:
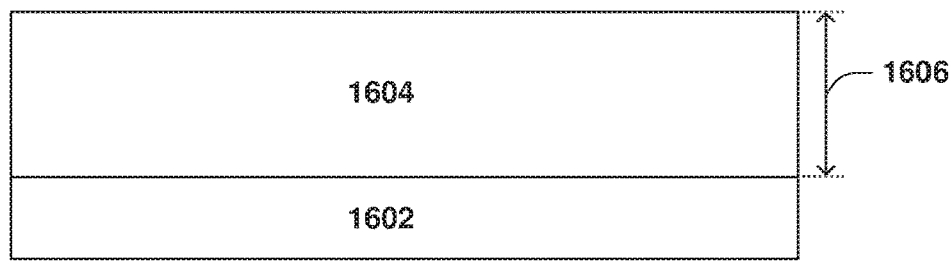
FIGS. 16-29 illustrate cross-sectional views of a semiconductor device at various stages of fabrication, in accordance with some embodiments.

FIG. 16 illustrates the semiconductor device 1600, according to some embodiments. In some embodiments, the semiconductor device 1600 comprises a first substrate 1602 and a first dielectric layer 1604. The first substrate 1602 comprises at least one of an epitaxial layer, a SOI structure, a wafer, or a die formed from a wafer. Other structures and configurations of the first substrate 1602 are within the scope of the present disclosure. The first substrate 1602 comprises at least one of silicon, germanium, carbide, arsenide, gallium, arsenic, phosphide, indium, antimonide, SiGe, SiC, GaAs, GaN, GaP, InGaP, InP, InAs, InSb, GaAsP, AlInAs, AlGaAs, GaInAs, GaInP, GaInAsP, or other suitable material. According to some embodiments, the first substrate 1602 comprises monocrystalline silicon, crystalline silicon with a <100> crystallographic orientation, crystalline silicon with a <110> crystallographic orientation or other suitable material. In some embodiments, the first substrate 1602 comprises at least one doped region.

In some embodiments, the first dielectric layer 1604 is formed over the first substrate 1602. In some embodiments, the first dielectric layer 1604 overlies the first substrate 1602. In some embodiments, the first dielectric layer 1604 is in direct contact with a top surface of the first substrate 1602. In some embodiments, the first dielectric layer 1604 comprises at least one of silicon, nitride, oxide, such as $SiO_2$, or other suitable material. In some embodiments, the first dielectric layer 1604 is a BOX. Other structures and configurations of the first dielectric layer 1604 are within the scope of the present disclosure. The first dielectric layer 1604 is formed by at least one of PVD, sputtering, CVD, LPCVD, ALCVD, UHVCVD, RPCVD, ALD, MBE, LPE, spin on, growth, or other suitable techniques. In some embodiments, the first dielectric layer 1604 has a thickness 1606 between about 5,000 angstroms and about 35,000 angstroms. Other values of the thickness 1606 are within the scope of the present disclosure.

Figure 17:
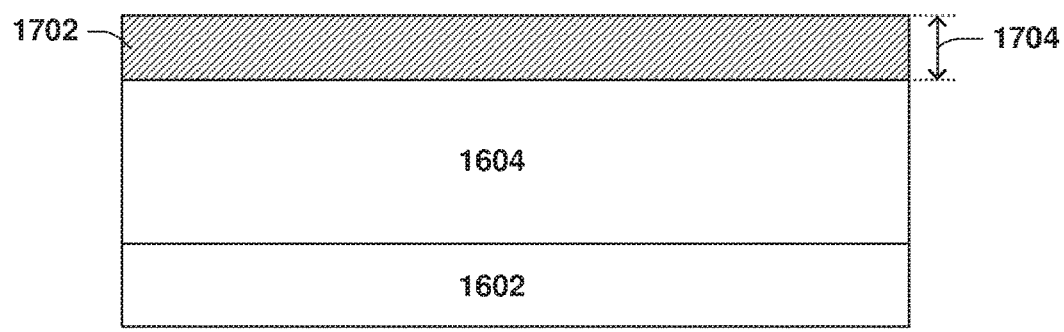

FIG. 17 illustrates a silicon nitride layer 1702 formed over the first dielectric layer 1604, according to some embodiments. In some embodiments, the silicon nitride layer 1702 overlies the first dielectric layer 1604. In some embodiments, the silicon nitride layer 1702 is in direct contact with a top surface of the first dielectric layer 1604. In some embodiments, the silicon nitride layer 1702 comprises $Si_xN_y$, or other suitable material. In some embodiments, x is 3 or a different suitable value. In some embodiments, y is 4 or a different suitable value. The silicon nitride layer 1702 is formed by at least one of PVD, sputtering, CVD, LPCVD, ALCVD, UHVCVD, RPCVD, ALD, MBE, LPE, spin on, growth, or other suitable techniques. In some embodiments, the silicon nitride layer 1702 has a thickness 1704 between about 4,000 angstroms and about 10,000 angstroms. Other values of the thickness 1704 are within the scope of the present disclosure.

In some embodiments, the silicon nitride layer 1702 comprises hydrogen, such as described with regard to silicon nitride layer 302. In some embodiments, the silicon nitride layer 1702 is annealed in a first annealing process to at least one of reduce or remove the hydrogen of the silicon nitride layer 1702. In some embodiments, the first annealing process comprises annealing the silicon nitride layer 1702 at a temperature of at least 1,000° C. or a temperature of at least 1,100° C. Other temperatures for performing the first annealing process are within the scope of the present disclosure. In some embodiments, the first annealing process comprises annealing the silicon nitride layer 1702 for a duration of time of at least 40 minutes or a duration of time of at least 60 minutes. Other durations of time for performing the first annealing process are within the scope of the present disclosure. In some embodiments, given that the silicon nitride layer 1702 is part of the semiconductor device 1600, the first annealing process comprises annealing at least one of the first dielectric layer 1604 or the first substrate 1602. Other processes, techniques, and parameters for annealing the silicon nitride layer 1702 are within the scope of the present disclosure.

Figure 18:
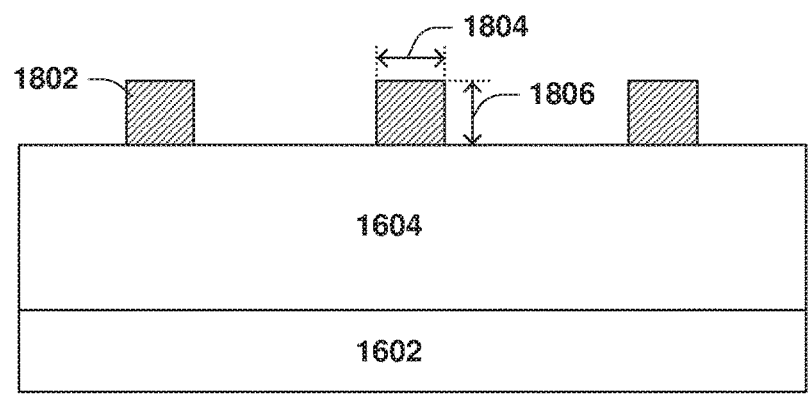

FIG. 18 illustrates one or more silicon nitride waveguides 1802 formed over the first dielectric layer 1604, according to some embodiments. In some embodiments, the one or more silicon nitride waveguides 1802 vary from one another to have at least one of different lengths, depths, thicknesses, widths, material compositions, etc. In some embodiments, the one or more silicon nitride waveguides 1802 do not vary from one another to have at least one of different lengths, depths, thicknesses, widths, material compositions, etc. Even though three silicon nitride waveguides 1802 are depicted, any number of silicon nitride waveguides 1802 are contemplated.

In some embodiments, the silicon nitride layer 1702 is patterned to form the one or more silicon nitride waveguides 1802. In some embodiments, the silicon nitride layer 1702 is patterned to form the one or more silicon nitride waveguides 1802 using a photoresist (not shown). In some embodiments, the photoresist is formed over the silicon nitride layer 1702. The photoresist is formed by at least one of PVD, sputtering, CVD, LPCVD, ALCVD, UHVCVD, RPCVD, ALD, MBE, LPE, spin on, growth, or other suitable techniques. The photoresist comprises a light-sensitive material, where properties, such as solubility, of the photoresist are affected by light. The photoresist is a negative photoresist or a positive photoresist.

According to some embodiments, one or more etchants have a selectivity such that the one or more etchants remove or etch away one or more layers exposed or not covered by the photoresist at a greater rate than the one or more etchants remove or etch away the photoresist. In some embodiments, the one or more layers comprise the silicon nitride layer 1702. In some embodiments, an opening in the photoresist allows the one or more etchants to form a corresponding opening in the one or more layers under the photoresist, and thereby transfer a pattern in the photoresist to the one or more layers under the photoresist. In some embodiments, the photoresist is removed after the pattern transfer, such as by at least one of CMP, etching, or other suitable techniques. According to some embodiments, the photoresist is at least one of stripped or washed away using at least one of HF, diluted HF, a chlorine compound such as HCl, $H_2S$, or other suitable material. Other processes and techniques for at least one of patterning the silicon nitride layer 1702 or forming the one or more silicon nitride waveguides 1802 are within the scope of the present disclosure.

According to some embodiments, an etching process used to remove portions of the silicon nitride layer 1702 to expose portions of the first dielectric layer 1604 and form the one or more silicon nitride waveguides 1802 is at least one of a dry etching process, a wet etching process, an anisotropic etching process, an isotropic etching process, or another suitable process. According to some embodiments, the etching process uses at least one of HF, diluted HF, a chlorine compound such as HCl, $H_2S$, or other suitable material. Other processes and techniques for at least one of removing portions of the silicon nitride layer 1702 to expose portions of the first dielectric layer 1604 or forming the one or more silicon nitride waveguides 1802 are within the scope of the present disclosure.

In some embodiments, a length 1804 of a top surface of a silicon nitride waveguide 1802 is about equal to a length 1806 of a sidewall of the silicon nitride waveguide 1802. In some embodiments, the length 1804 of the top surface of the silicon nitride waveguide 1802 is different than the length 1806 of the sidewall of the silicon nitride waveguide 1802. In some embodiments, the length 1804 of the top surface of the silicon nitride waveguide 1802 is between about 4,000 angstroms and about 10,000 angstroms. Other values of the length 1804 of the top surface of the silicon nitride waveguide 1802 are within the scope of the present disclosure. In some embodiments, the length 1806 of the sidewall of the silicon nitride waveguide 1802 is between about 4,000 angstroms and about 10,000 angstroms. Other values of the length 1806 of the sidewall of the silicon nitride waveguide 1802 are within the scope of the present disclosure.

In some embodiments, the one or more silicon nitride waveguides 1802 are annealed in a second annealing process. In some embodiments, the second annealing process is performed to anneal the one or more silicon nitride waveguides 1802 in addition, or as an alternative, to performing the first annealing process to anneal the silicon nitride layer 1702. In some embodiments, the second annealing process comprises annealing the one or more silicon nitride waveguides 1802 to at least one of reduce or remove hydrogen of the one or more silicon nitride waveguides 1802. In some embodiments, the second annealing process comprises annealing the one or more silicon nitride waveguides 1802 at a temperature of at least 1,000° C. or a temperature of at least 1,100° C. Other temperatures for performing the second annealing process are within the scope of the present disclosure. In some embodiments, the second annealing process comprises annealing the one or more silicon nitride waveguides 1802 for a duration of time of at least 40 minutes or a duration of time of at least 60 minutes. Other durations of time for performing the second annealing process are within the scope of the present disclosure. In some embodiments, given that the one or more silicon nitride waveguides 1802 are part of the semiconductor device 1600, the second annealing process comprises annealing at least one of the first dielectric layer 1604 or the first substrate 1602. Other processes, techniques, and parameters for annealing the one or more silicon nitride waveguides 1802 are within the scope of the present disclosure.

In some embodiments, at least one of the removal of hydrogen or the reduction in hydrogen of the one or more silicon nitride waveguides 1802 provides for reduced propagation loss of a signal, such as an optical signal, that is propagated via a silicon nitride waveguide 1802. In some embodiments, the propagation loss corresponds to the propagation loss described with regard to the one or more silicon nitride waveguides 402.

Figure 19:
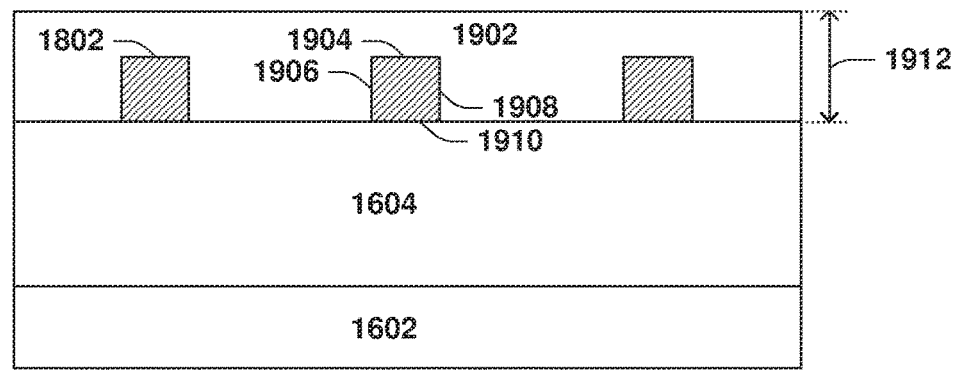

FIG. 19 illustrates a second dielectric layer 1902 formed over at least one of the one or more silicon nitride waveguides 1802 or the first dielectric layer 1604, according to some embodiments. In some embodiments, the second dielectric layer 1902 overlies at least one of the one or more silicon nitride waveguides 1802 or the first dielectric layer 1604. In some embodiments, the second dielectric layer 1902 is in direct contact with the top surface of the first dielectric layer 1604. In some embodiments, the second dielectric layer 1902 is different than the first dielectric layer 1604, such as having a different material composition, such that an interface is defined between the second dielectric layer 1902 and the first dielectric layer 1604. In some embodiments, the second dielectric layer 1902 does not have a material composition different than the first dielectric layer 1604. In some embodiments, the second dielectric layer 1902 comprises at least one of silicon, nitride, oxide, such as $SiO_2$, or other suitable material. The second dielectric layer 1902 is formed by at least one of PVD, sputtering, CVD, LPCVD, ALCVD, UHVCVD, RPCVD, ALD, MBE, LPE, spin on, growth, or other suitable techniques. In some embodiments, a thickness 1912 of the second dielectric layer 1902 is at least 5,000 angstroms. Other values of the thickness 1912 are within the scope of the present disclosure.

In some embodiments, the second dielectric layer 1902 is in direct contact with one or more top surfaces of the one or more silicon nitride waveguides 1802. In some embodiments, the second dielectric layer 1902 is in direct contact with sidewalls of the one or more silicon nitride waveguides 1802. In some embodiments, a bottom surface 1910 of a silicon nitride waveguide 1802 is at least one of in direct contact with or adjacent to the first dielectric layer 1604. In some embodiments, a first sidewall 1906 of the silicon nitride waveguide 1802 is at least one of in direct contact with or adjacent to a sidewall of the second dielectric layer 1902. In some embodiments, a second sidewall 1908 of the silicon nitride waveguide 1802 is at least one of in direct contact with or adjacent to a sidewall of the second dielectric layer 1902. In some embodiments, a top surface 1904 of the silicon nitride waveguide 1802 is at least one of in direct contact with or adjacent to the second dielectric layer 1902. In some embodiments where there are two or more silicon nitride waveguides 1802, a portion of the second dielectric layer 1902 separates a first silicon nitride waveguide 1802 from a second silicon nitride waveguide 1802. Other structures and configurations of the second dielectric layer 1902 are within the scope of the present disclosure.

In some embodiments, a top surface of the second dielectric layer 1902 is at least one of smoothed or planarized, such as by at least one of CMP, etching, or other suitable techniques. According to some embodiments, a portion of the second dielectric layer 1902 is removed, such as by at least one of CMP, etching, or other suitable techniques. According to some embodiments, the top surface of the second dielectric layer 1902 is made substantially planar when the portion of the second dielectric layer 1902 is removed. In some embodiments, the thickness 1912 of the second dielectric layer 1902 is less than 5,000 angstroms when the portion of the second dielectric layer 1902 is removed. Other processes and techniques for forming the second dielectric layer 1902 are within the scope of the present disclosure.

Figure 20:
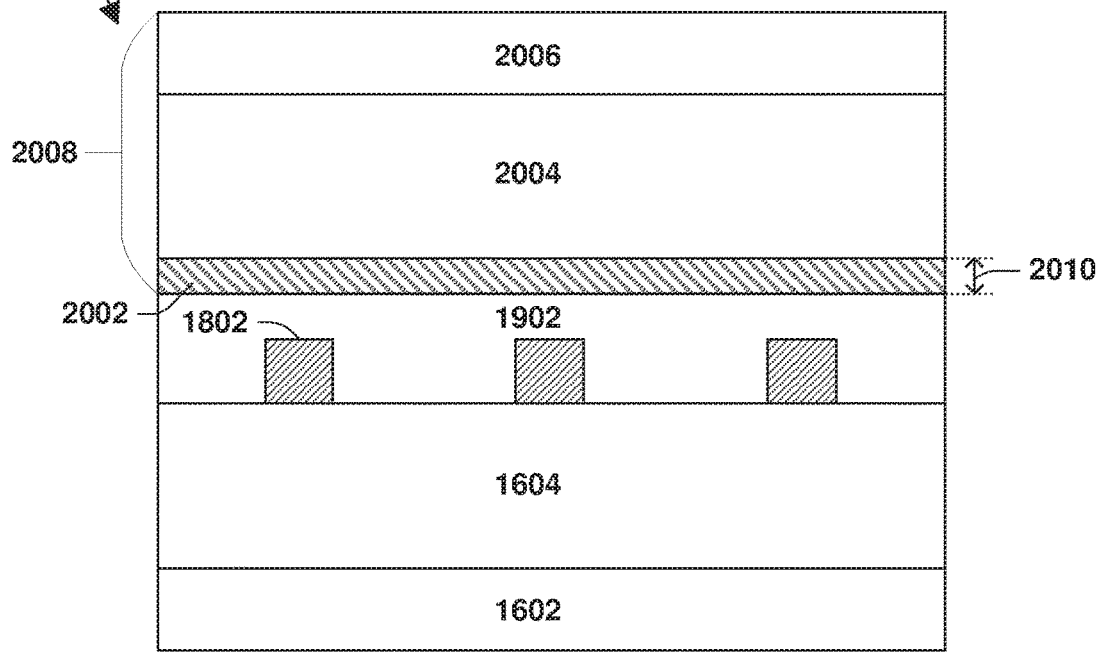

FIG. 20 illustrates a composite 2008 formed over the second dielectric layer 1902, according to some embodiments. In some embodiments, the composite 2008 overlies the second dielectric layer 1902. In some embodiments, the composite 2008 is in direct contact with the top surface of the second dielectric layer 1902.

In some embodiments, the composite 2008 is bonded with the second dielectric layer 1902, such as by at least one of an adhesive, one or more bonding layers, a bonding process, or other suitable techniques. In some embodiments where the composite 2008 is bonded with the second dielectric layer 1902 using the one or more bonding layers, the one or more bonding layers are between the composite 2008 and the second dielectric layer 1902. Other processes and techniques for at least one of forming or bonding the composite 2008 are within the scope of the present disclosure.

In some embodiments, the composite 2008 comprises at least one of a semiconductor layer 2002 or one or more layers over the semiconductor layer 2002. Other structures and configurations of the composite 2008 are within the scope of the present disclosure. In some embodiments, the one or more layers overlie the semiconductor layer 2002. In some embodiments, the one or more layers comprise at least one of a second substrate 2006, a third dielectric layer 2004, or a different layer.

In some embodiments, the semiconductor layer 2002 underlies the one or more layers. In some embodiments, the semiconductor layer 2002 is in direct contact with a bottommost surface of the one or more layers. In some embodiments, the semiconductor layer 2002 overlies the second dielectric layer 1902. In some embodiments, the semiconductor layer 2002 is in direct contact with the top surface of the second dielectric layer 1902. In some embodiments, the semiconductor layer 2002 comprises at least one of a semiconductor material or other suitable material. According to some embodiments, the semiconductor layer 2002 comprises silicon, such as monocrystalline silicon, crystalline silicon with a <100> crystallographic orientation, crystalline silicon with a <110> crystallographic orientation or other suitable material. In some embodiments, the semiconductor layer 2002 has a thickness 2010 between about 2,000 angstroms and about 4,000 angstroms. Other values of the thickness 2010 are within the scope of the present disclosure.

In some embodiments, the third dielectric layer 2004 overlies the semiconductor layer 2002. In some embodiments, the third dielectric layer 2004 is in direct contact with a top surface of the semiconductor layer 2002. In some embodiments, the third dielectric layer 2004 comprises at least one of silicon, nitride, oxide, such as $SiO_2$, or other suitable material. In some embodiments, the third dielectric layer 2004 is a BOX. Other structures and configurations of the third dielectric layer 2004 are within the scope of the present disclosure.

In some embodiments, the second substrate 2006 overlies the third dielectric layer 2004. In some embodiments, the second substrate 2006 is in direct contact with a top surface of the third dielectric layer 2004. The second substrate 2006 comprises at least one of an epitaxial layer, a SOI structure, a wafer, or a die formed from a wafer. Other structures and configurations of the second substrate 2006 are within the scope of the present disclosure. The second substrate 2006 comprises at least one of silicon, germanium, carbide, arsenide, gallium, arsenic, phosphide, indium, antimonide, SiGe, SiC, GaAs, GaN, GaP, InGaP, InP, InAs, InSb, GaAsP, AlInAs, AlGaAs, GaInAs, GaInP, GaInAsP, or other suitable material. According to some embodiments, the second substrate 2006 comprises monocrystalline silicon, crystalline silicon with a <100> crystallographic orientation, crystalline silicon with a <110> crystallographic orientation, or other suitable material. In some embodiments, the second substrate 2006 comprises at least one doped region. In some embodiments, the composite 2008 is formed with the second substrate 2006 as the bottom of the composite and then inverted to be placed on the second dielectric layer 1902 as illustrated in FIG. 20.

Figure 21:
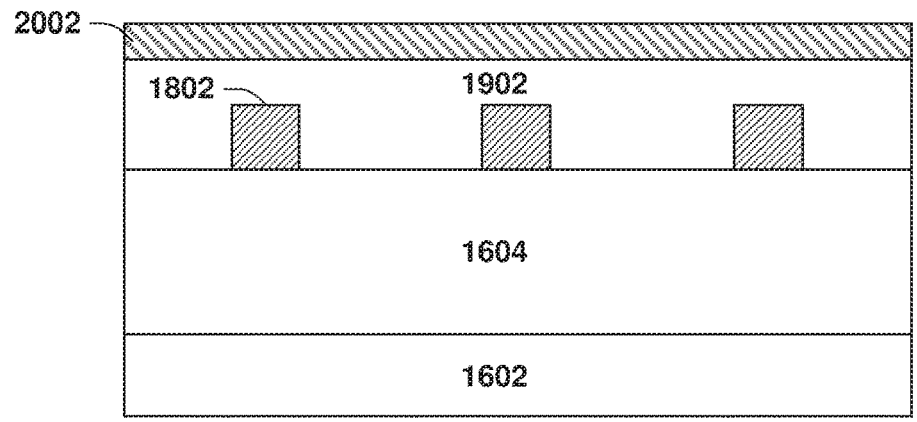

FIG. 21 illustrates removal of the one or more layers, according to some embodiments. In some embodiments, the one or more layers are removed, such as by at least one of CMP, etching, or other suitable techniques. In some embodiments, the one or more layers are removed to expose the semiconductor layer 2002. In some embodiments, the one or more layers are removed by removing the second substrate 2006 and the third dielectric layer 2004. Other processes and techniques for at least one of removing the one or more layers or exposing the semiconductor layer 2002 are within the scope of the present disclosure.

Figure 22:
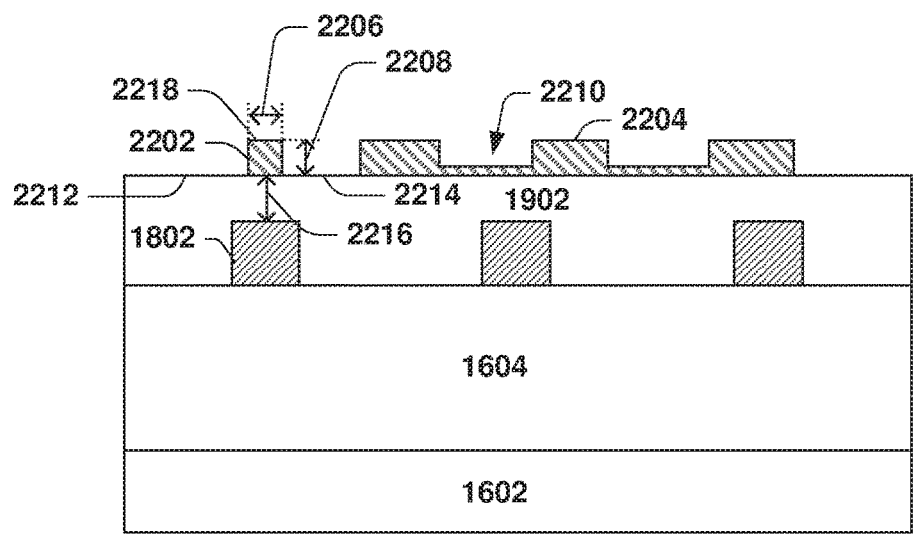

FIG. 22 illustrates a semiconductor waveguide 2202 formed over the second dielectric layer 1902, according to some embodiments. In some embodiments, the semiconductor waveguide 2202 overlies a silicon nitride waveguide 1802. Even though one semiconductor waveguide 2202 is depicted, any number of semiconductor waveguides 2202 are contemplated. In some embodiments, a modulator structure 2204 is formed over the second dielectric layer 1902. In some embodiments, the modulator structure 2204 is formed by at least one of an IMP process or another suitable technique.

In some embodiments, the semiconductor layer 2002 is patterned to form at least one of the semiconductor waveguide 2202 or the modulator structure 2204. In some embodiments, the semiconductor layer 2002 is treated, such as having features, elements, etc. selectively formed therein, having dopants selectively implanted therein, etc., at least one of before or after being patterned. In some embodiments, the semiconductor layer 2002 is treated prior to at least one of the aforementioned first annealing process or the second annealing process. In some embodiments, the semiconductor layer 2002 is patterned to expose a top surface of the second dielectric layer 1902, such as to expose at least one of a first portion 2212 of the top surface of the second dielectric layer 1902 or a second portion 2214 of the top surface of the second dielectric layer 1902. In some embodiments, the first portion 2212 of the top surface of the second dielectric layer 1902 and the second portion 2214 of the top surface of the second dielectric layer 1902 are laterally offset from the semiconductor waveguide 2202. In some embodiments, the semiconductor layer 2002 is patterned to form one or more trenches 2210 defined in the modulator structure 2204.

In some embodiments, the semiconductor layer 2002 is patterned to form at least one of the semiconductor waveguide 2202 or the modulator structure 2204 using a photoresist (not shown), such as corresponding to previously described use(s) of a photoresist. According to some embodiments, an etching process, such as corresponding to previously described etching process(es), used to remove portions of the semiconductor layer 2002 to at least one of expose portions of the second dielectric layer 1902, form the semiconductor waveguide 2202, form the one or more trenches 2210, or form the modulator structure 2204, is at least one of a dry etching process, a wet etching process, an anisotropic etching process, an isotropic etching process, or another suitable process. According to some embodiments, the etching process uses at least one of HF, diluted HF, a chlorine compound such as HCl, $H_2S$, or other suitable material. Other processes and techniques for at least one of patterning the semiconductor layer 2002, forming the semiconductor waveguide 2202, or forming the modulator structure 2204 are within the scope of the present disclosure.

In some embodiments, a length 2206 of a top surface 2218 of the semiconductor waveguide 2202 is about equal to a length 2208 of a sidewall of the semiconductor waveguide 2202. In some embodiments, the length 2206 of the top surface 2218 of the semiconductor waveguide 2202 is different than the length 2208 of the sidewall of the semiconductor waveguide 2202. In some embodiments, the length 2206 of the top surface 2218 of the semiconductor waveguide 2202 is between about 2,000 angstroms and about 4,000 angstroms. Other values of the length 2206 of the top surface 2218 of the semiconductor waveguide 2202 are within the scope of the present disclosure. In some embodiments, the length 2208 of the sidewall of the semiconductor waveguide 2202 is between about 2,000 angstroms and about 4,000 angstroms. Other values of the length 2208 of the sidewall of the semiconductor waveguide 2202 are within the scope of the present disclosure. In some embodiments, a distance 2216 between the semiconductor waveguide 2202 and a silicon nitride waveguide 1802 underlying the semiconductor waveguide 2202 is between about 1,000 angstroms and about 5,000 angstroms. Other values of the distance 2216 between the semiconductor waveguide 2202 and the silicon nitride waveguide 1802 are within the scope of the present disclosure.

Figure 23:
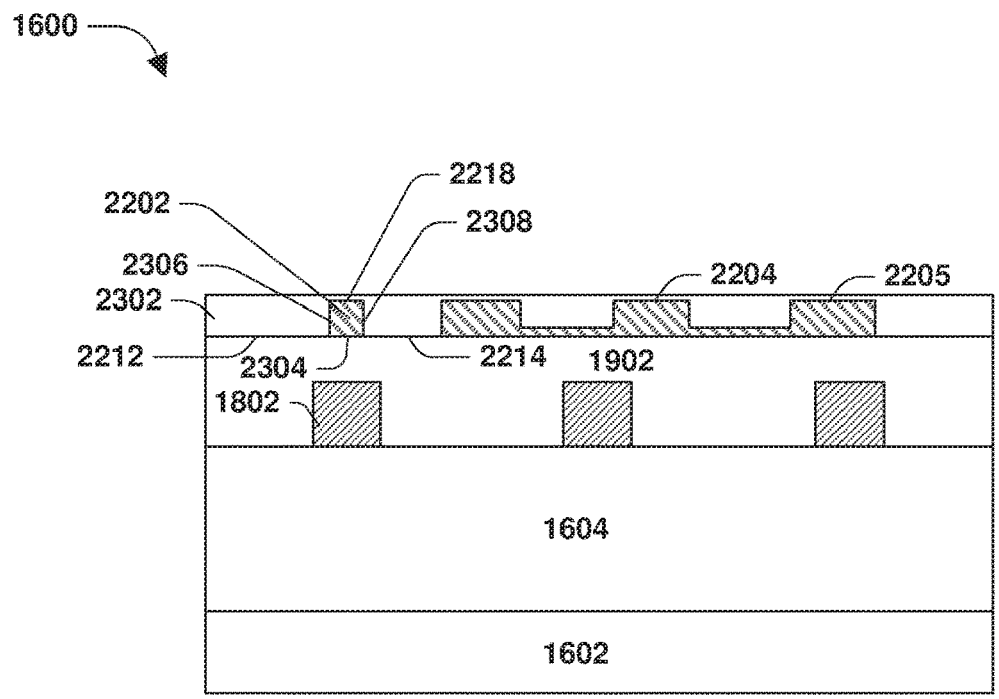

FIG. 23 illustrates a fourth dielectric layer 2302 formed over at least one of the semiconductor waveguide 2202, the modulator structure 2204, or the second dielectric layer 1902, according to some embodiments. In some embodiments, the fourth dielectric layer 2302 overlies at least one of the semiconductor waveguide 2202, the modulator structure 2204, or the second dielectric layer 1902. In some embodiments, the fourth dielectric layer 2302 is in direct contact with one or more portions of the top surface of the second dielectric layer 1902, such as the first portion 2212 of the top surface of the second dielectric layer 1902 and the second portion 2214 of the top surface of the second dielectric layer 1902. In some embodiments, the fourth dielectric layer 2302 is different than the second dielectric layer 1902, such as having a different material composition, such that an interface is defined between the fourth dielectric layer 2302 and the second dielectric layer 1902. In some embodiments, the fourth dielectric layer 2302 does not have a material composition different than the second dielectric layer 1902. In some embodiments, the fourth dielectric layer 2302 comprises at least one of silicon, nitride, oxide, such as $SiO_2$, or other suitable material. The fourth dielectric layer 2302 is formed by at least one of PVD, sputtering, CVD, LPCVD, ALCVD, UHVCVD, RPCVD, ALD, MBE, LPE, spin on, growth, or other suitable techniques.

In some embodiments, the fourth dielectric layer 2302 is in direct contact with at least one of the top surface 2218 of the semiconductor waveguide 2202 or a top surface 2205 of the modulator structure 2204. According to some embodiments, a top surface of the fourth dielectric layer 2302 and the top surface 2218 of the semiconductor waveguide 2202 are substantially coplanar. According to some embodiments, the top surface of the fourth dielectric layer 2302 and the top surface 2205 of the modulator structure 2204 are substantially coplanar. In some embodiments, the fourth dielectric layer 2302 is in direct contact with at least one of sidewalls of the semiconductor waveguide 2202 or sidewalls of the modulator structure 2204. In some embodiments, a bottom surface 2304 of the semiconductor waveguide 2202 is at least one of in direct contact with or adjacent to the second dielectric layer 1902. In some embodiments, a bottom surface of the modulator structure 2204 is at least one of in direct contact with or adjacent to the second dielectric layer 1902. In some embodiments, a first sidewall 2306 of the semiconductor waveguide 2202 is at least one of in direct contact with or adjacent to a sidewall of the fourth dielectric layer 2302. In some embodiments, a second sidewall 2308 of the semiconductor waveguide 2202 is at least one of in direct contact with or adjacent to a sidewall of the fourth dielectric layer 2302. In some embodiments, a sidewall of the fourth dielectric layer 2302 is at least one of in direct contact with or adjacent to the modulator structure 2204. In some embodiments, a portion of the fourth dielectric layer 2302 separates the semiconductor waveguide 2202 from the modulator structure 2204. In some embodiments, a portion of the fourth dielectric layer 2302 at least one of overlies or is in direct contact with at least one of the top surface 2218 of the semiconductor waveguide 2202 or the top surface 2205 of the modulator structure 2204. Other structures and configurations of the fourth dielectric layer 2302, the semiconductor waveguide 2202, the second dielectric layer 1902, and the modulator structure 2204 are within the scope of the present disclosure.

Figure 24:
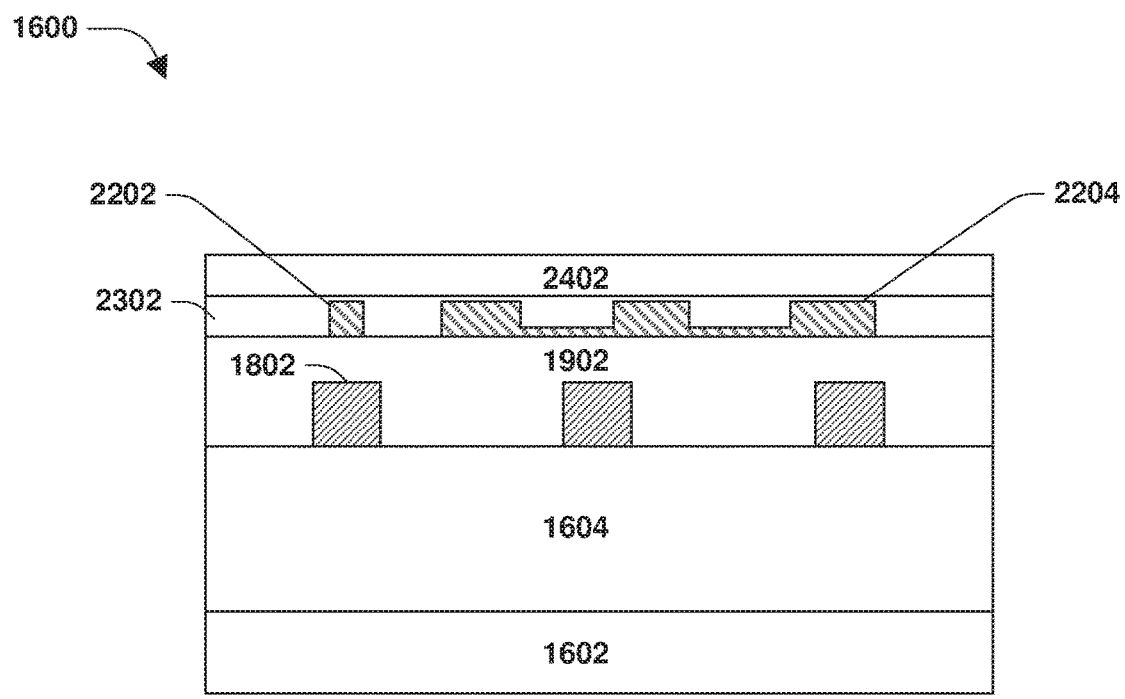

FIG. 24 illustrates a fifth dielectric layer 2402 formed over the fourth dielectric layer 2302, according to some embodiments. In some embodiments, the fifth dielectric layer 2402 overlies the fourth dielectric layer 2302. In some embodiments, the fifth dielectric layer 2402 is in direct contact with the top surface of the fourth dielectric layer 2302. In some embodiments, the fifth dielectric layer 2402 is different than the fourth dielectric layer 2302, such as having a different material composition, such that an interface is defined between the fifth dielectric layer 2402 and the fourth dielectric layer 2302. In some embodiments, the fifth dielectric layer 2402 comprises at least one of silicon, nitride, oxide, such as $SiO_2$, or other suitable material. In some embodiments, the fifth dielectric layer 2402 is formed by at least one of PVD, sputtering, CVD, LPCVD, ALCVD, UHVCVD, RPCVD, ALD, MBE, LPE, spin on, growth, or other suitable techniques. In some embodiments, the fifth dielectric layer 2402 is an ILD. Other structures and configurations of the fifth dielectric layer 2402 are within the scope of the present disclosure.

Figure 25:
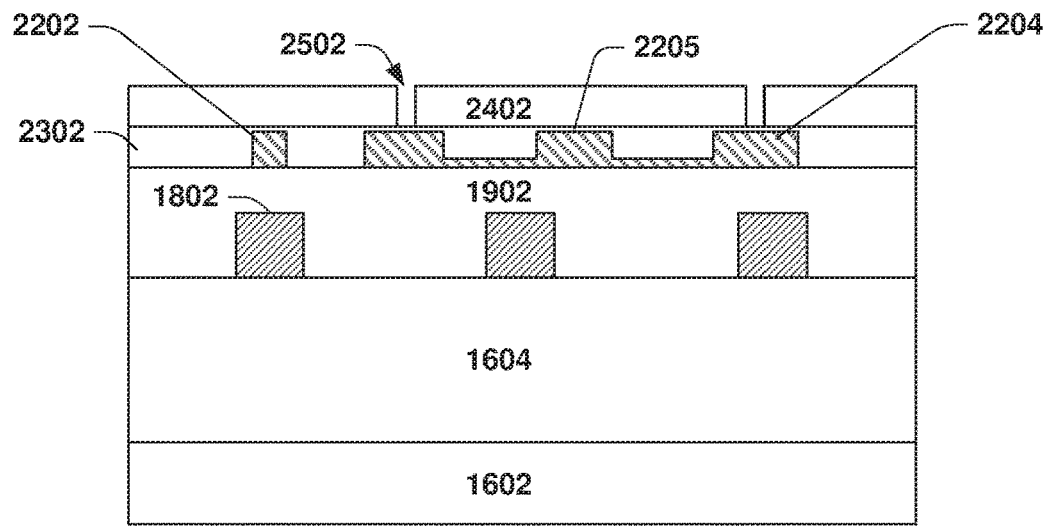

FIG. 25 illustrates one or more first openings 2502 formed in at least one of the fifth dielectric layer 2402 or the fourth dielectric layer 2302, according to some embodiments. In some embodiments, the one or more first openings 2502 expose the top surface 2205 of the modulator structure 2204. In some embodiments, a portion of the fifth dielectric layer 2402 is removed to form an opening of the one or more first openings 2502. In some embodiments where a portion of the fourth dielectric layer 2302 at least one of overlies or is in direct contact with the top surface 2205 of the modulator structure 2204, a portion of the fourth dielectric layer 2302 is removed to form an opening of the one or more first openings 2502. Other structures and configurations of the one or more first openings 2502 are within the scope of the present disclosure.

In some embodiments, at least one of the fifth dielectric layer 2402 or the fourth dielectric layer 2302 are patterned to form the one or more first openings 2502 using a photoresist (not shown), such as corresponding to previously described use(s) of a photoresist. According to some embodiments, an etching process, such as corresponding to previously described etching process(es), used to form the one or more first openings 2502 is at least one of a dry etching process, a wet etching process, an anisotropic etching process, an isotropic etching process, or another suitable process. According to some embodiments, the etching process uses at least one of HF, diluted HF, a chlorine compound such as HCl, $H_2S$, or other suitable material. Other processes and techniques for forming the one or more first openings 2502 are within the scope of the present disclosure.

Figure 26:
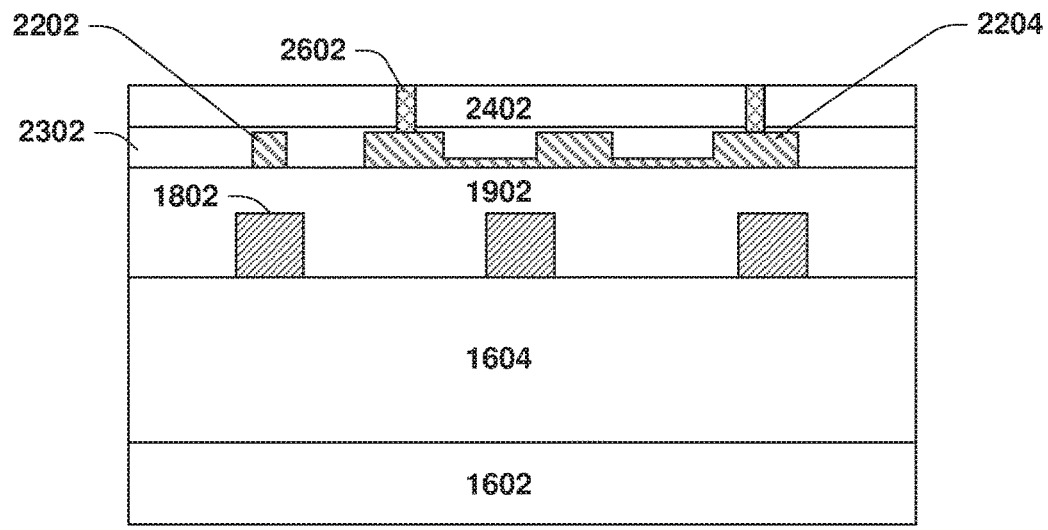

FIG. 26 illustrates one or more first conductive structures 2602 formed in at least one of the first openings 2502 in at least one of the fifth dielectric layer 2402 or the fourth dielectric layer 2302, according to some embodiments. In some embodiments, the one or more first conductive structures 2602 overlie the modulator structure 2204. In some embodiments, the one or more first conductive structures 2602 are in direct contact with the modulator structure 2204. According to some embodiments, the one or more first conductive structures 2602 comprise a conductive material, such as a metal material, such as copper, or other suitable material. The one or more first conductive structures 2602 are formed by at least one of PVD, sputtering, CVD, LPCVD, ALCVD, UHVCVD, RPCVD, ALD, MBE, LPE, spin on, growth, or other suitable techniques. Even though two conductive structures of the one or more first conductive structures 2602 are depicted, any number of conductive structures of the one or more first conductive structures 2602 are contemplated.

Figure 27:
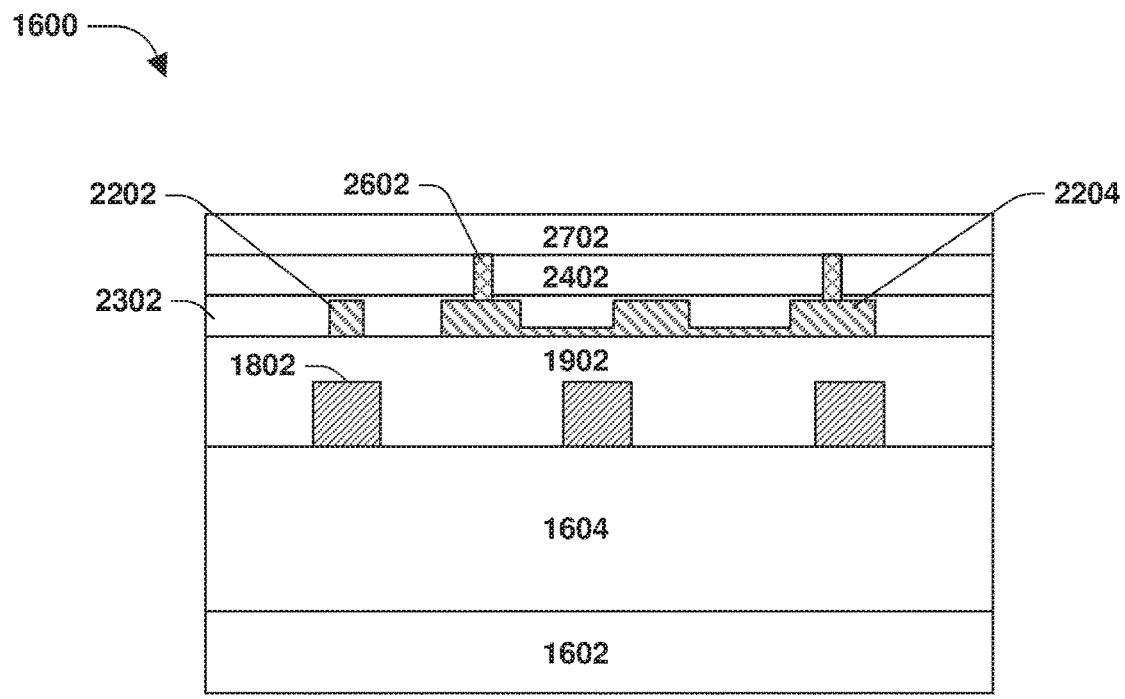

FIG. 27 illustrates a sixth dielectric layer 2702 formed over the fifth dielectric layer 2402, according to some embodiments. In some embodiments, the sixth dielectric layer 2702 overlies the fifth dielectric layer 2402. In some embodiments, the sixth dielectric layer 2702 is in direct contact with a top surface of the fifth dielectric layer 2402. In some embodiments, the sixth dielectric layer 2702 is different than the fifth dielectric layer 2402, such as having a different material composition, such that an interface is defined between the sixth dielectric layer 2702 and the fifth dielectric layer 2402. In some embodiments, the sixth dielectric layer 2702 does not have a material composition different than the fifth dielectric layer 2402. In some embodiments, the sixth dielectric layer 2702 comprises at least one of silicon, nitride, oxide, such as $SiO_2$, or other suitable material. The sixth dielectric layer 2702 is formed by at least one of PVD, sputtering, CVD, LPCVD, ALCVD, UHVCVD, RPCVD, ALD, MBE, LPE, spin on, growth, or other suitable techniques. In some embodiments, the sixth dielectric layer 2702 is an IMD. Other structures and configurations of the sixth dielectric layer 2702 are within the scope of the present disclosure.

Figure 28:
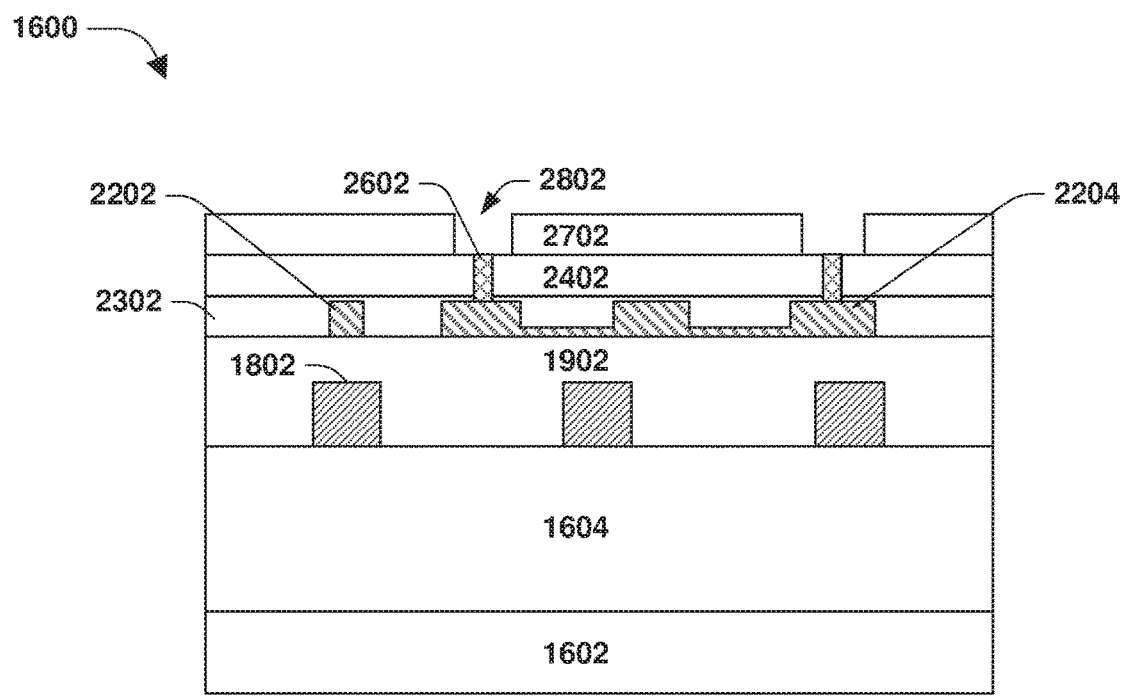

FIG. 28 illustrates one or more trenches 2802 formed in the sixth dielectric layer 2702, according to some embodiments. In some embodiments, the one or more trenches 2802 expose the one or more first conductive structures 2602. In some embodiments, a portion of the sixth dielectric layer 2702 is removed to form a trench of the one or more trenches 2802. Other structures and configurations of the one or more trenches 2802 are within the scope of the present disclosure.

In some embodiments, the sixth dielectric layer 2702 is patterned to form the one or more trenches 2802 using a photoresist (not shown), such as corresponding to previously described use(s) of a photoresist. According to some embodiments, an etching process, such as corresponding to previously described etching process(es), used to form the one or more trenches 2802 is at least one of a dry etching process, a wet etching process, an anisotropic etching process, an isotropic etching process, or another suitable process. According to some embodiments, the etching process uses at least one of HF, diluted HF, a chlorine compound such as HCl, $H_2S$, or other suitable material. Other processes and techniques for forming the one or more trenches 2802 are within the scope of the present disclosure.

Figure 29:
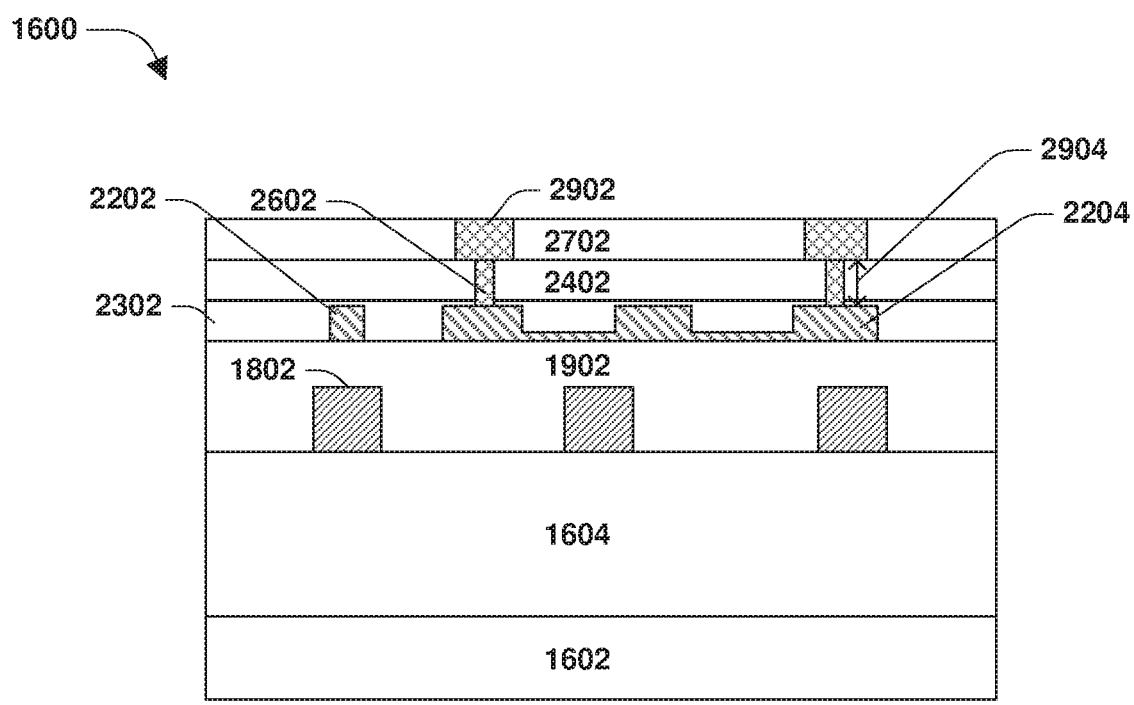

FIG. 29 illustrates one or more second conductive structures 2902 formed in at least one of the trenches 2802 in the sixth dielectric layer 2702, according to some embodiments. In some embodiments, the one or more second conductive structures 2902 overlie at least one of the one or more first conductive structures 2602 or the modulator structure 2204. In some embodiments, the one or more second conductive structures 2902 are in direct contact with the one or more first conductive structures 2602. According to some embodiments, the one or more second conductive structures 2902 comprise a conductive material, such as a metal material, such as copper, or other suitable material. The one or more second conductive structures 2902 are formed by at least one of PVD, sputtering, CVD, LPCVD, ALCVD, UHVCVD, RPCVD, ALD, MBE, LPE, spin on, growth, or other suitable techniques. Even though two conductive structures of the one or more second conductive structures 2902 are depicted, any number of conductive structures of the one or more second conductive structures 2902 are contemplated.

According to some embodiments, the one or more first conductive structures 2602 and the one or more second conductive structures 2902 are formed by a dual damascene process, such as corresponding to that which is described with regard to first conductive structures 1202 and second conductive structures 1502. In some embodiments, at least some of the one or more first conductive structures 2602 are formed concurrently with or during a same process as formation of at least some of the one or more second conductive structures 2902. In some embodiments, at least some of the one or more first conductive structures 2602 are not formed concurrently with or during a same process as formation of at least some of the one or more second conductive structures 2902. In some embodiments, at least some of the one or more first conductive structures 2602 have a same material composition as at least some of the one or more second conductive structures 2902. In some embodiments, at least some of the one or more first conductive structures 2602 do not have a same material composition as at least some of the one or more second conductive structures 2902. Other processes and techniques for forming the one or more first conductive structures 2602 and the one or more second conductive structures 2902 are within the scope of the present disclosure.

In some embodiments, the one or more first conductive structures 2602 are one or more vias. Other structures and configurations of one or more first conductive structures 2602 are within the scope of the present disclosure. In some embodiments, the one or more second conductive structures 2902 are at least one of one or more metal contacts, one or more metal pads, or one or more metal terminals. Other structures and configurations of one or more second conductive structures 2902 are within the scope of the present disclosure. In some embodiments, the one or more second conductive structures 2902 are connected to at least one of various doped features, circuitry, input/output, etc. of the semiconductor device 1600.

In some embodiments, an electrical signal is transmitted to the modulator structure 2204 via a conductive structure of the one or more second conductive structures 2902 and a corresponding conductive structure of the one or more first conductive structures 2602. Other structures, configurations, and techniques for transmitting the electrical signal to the modulator structure 2204 are within the scope of the present disclosure. In some embodiments, the electrical signal is converted, such as by at least one of the modulator structure 2204 or the semiconductor waveguide 2202, to an optical signal. In some embodiments, the optical signal is propagated via at least one of the semiconductor waveguide 2202 or a silicon nitride waveguide 1802 underlying the semiconductor waveguide 2202. According to some embodiments, further operation corresponds to that which is described with regard to FIG. 15.

In some embodiments, a distance 2904 between a second conductive structure 2902 and the modulator structure 2204 is reduced as a result of the modulator structure 2204 being in the fourth dielectric layer 2302 between the one or more silicon nitride waveguides 1802 and the one or more second conductive structures 2902, in comparison with some semiconductor devices having a silicon nitride waveguide over a modulator structure, such as corresponding to that which is described with regard to FIG. 15. The reduced distance 2904 provides for transmission of the electrical signal, from the second conductive structure 2902 to the modulator structure 2204, with a reduced amount of signal loss.

In some embodiments, performing at least one of the first annealing process or the second annealing process provides for improved propagation of the optical signal, such as having a wavelength between about 1,500 nanometers and about 1,600 nanometers, via the silicon nitride waveguide 1802. Other wavelengths of the optical signal are within the scope of the present disclosure. In some embodiments, performing at least one of the first annealing process or the second annealing process enables the semiconductor device 1600 to propagate the optical signal having a wavelength between about 1,500 nanometers and about 1,600 nanometers via the silicon nitride waveguide 1802, such as corresponding to that which is described with regard to FIG. 15. Other wavelengths of the optical signal are within the scope of the present disclosure.

At least one of forming the one or more silicon nitride waveguides 1802 or annealing the one or more silicon nitride waveguides 1802 prior to forming at least one of the modulator structure 2204 or the semiconductor waveguide 2202 provides for the one or more silicon nitride waveguides 1802 being annealed without affecting at least one of the modulator structure 2204 or the semiconductor waveguide 2202, such as at least one of activating, migrating, etc. dopants, melting materials, etc. in at least one of the modulator structure 2204 or the semiconductor waveguide 2202. In some embodiments, at least one of forming the one or more silicon nitride waveguides 1802 or annealing the one or more silicon nitride waveguides 1802 prior to forming at least one of the modulator structure 2204 or the semiconductor waveguide 2202 enables the semiconductor device 1600 to propagate an optical signal having a wavelength between about 1,500 nanometers and about 1,600 nanometers via a silicon nitride waveguide 1802. Other wavelengths of the optical signal are within the scope of the present disclosure. In some embodiments, at least one of forming the one or more silicon nitride waveguides 1802 or annealing the one or more silicon nitride waveguides 1802 prior to forming at least one of the modulator structure 2204 or the semiconductor waveguide 2202 provides for the semiconductor device 1600 propagating an optical signal having a wavelength between about 1,500 nanometers and about 1,600 nanometers via a silicon nitride waveguide 1802 with a reduced propagation loss. Other wavelengths of the optical signal are within the scope of the present disclosure.

According to some embodiments, at least one of the one or more layers, features, structures, elements, etc. disclosed herein are in direct contact with another of the one or more layers, features, structures, elements, etc. disclosed herein. According to some embodiments, at least one of the one or more layers, features, structures, elements, etc. disclosed herein are not in direct contact with another of the one or more layers, features, structures, elements, etc. disclosed herein, such as where one or more intervening, separating, etc. layers, features, structures, elements, etc. exist.

In some embodiments, a semiconductor device is provided. The semiconductor device includes a silicon nitride waveguide in a first dielectric layer over a substrate. The semiconductor device includes a semiconductor waveguide in a second dielectric layer over the first dielectric layer. The first dielectric layer including the silicon nitride waveguide is between the second dielectric layer including the semiconductor waveguide and the substrate.

In some embodiments, a method for forming a semiconductor device is provided. The method includes forming a first dielectric layer over a semiconductor layer. The method includes forming a silicon nitride waveguide over the first dielectric layer. The method includes forming a second dielectric layer over the silicon nitride waveguide. The method includes forming a substrate over the second dielectric layer. The method includes performing an inversion operation such that the substrate is a bottommost layer of the semiconductor device. The method includes removing one or more layers over the semiconductor layer to expose the semiconductor layer.

In some embodiments, a method for forming a semiconductor device is provided. The method includes forming a first dielectric layer over a first substrate. The method includes forming a silicon nitride waveguide over the first dielectric layer. The method includes forming a second dielectric layer over the silicon nitride waveguide. The method includes forming a composite over the second dielectric layer, wherein the composite includes a semiconductor layer and one or more layers over the semiconductor layer. The method includes removing the one or more layers to expose the semiconductor layer.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

It will be appreciated that layers, features, elements, etc. depicted herein are illustrated with particular dimensions relative to one another, such as structural dimensions or orientations, for example, for purposes of simplicity and ease of understanding and that actual dimensions of the same differ substantially from that illustrated herein, in some embodiments. Additionally, a variety of techniques exist for forming the layers, regions, features, elements, etc. mentioned herein, such as at least one of etching techniques, planarization techniques, implanting techniques, doping techniques, spin-on techniques, sputtering techniques, growth techniques, or deposition techniques such as chemical vapor deposition (CVD), for example.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for forming a semiconductor device, comprising:
   forming a first dielectric layer over a semiconductor layer;
   forming a silicon nitride waveguide over the first dielectric layer;
   forming a second dielectric layer over the silicon nitride waveguide;
   forming a substrate over the second dielectric layer;
   performing an inversion operation such that the substrate is a bottommost layer of the semiconductor device;
   removing one or more layers over the semiconductor layer to expose the semiconductor layer;
   patterning the semiconductor layer, after the semiconductor layer is exposed, to form a semiconductor waveguide overlying the silicon nitride waveguide, wherein patterning the semiconductor layer exposes a top surface of the first dielectric layer; and
   forming a third dielectric layer over the top surface of the first dielectric layer, wherein a bottom surface of the semiconductor waveguide is adjacent to the first dielectric layer, a first sidewall of the semiconductor waveguide is adjacent to the third dielectric layer, and a second sidewall of the semiconductor waveguide is adjacent to the third dielectric layer.

2. The method of claim 1, comprising:
   after forming the silicon nitride waveguide and prior to forming the second dielectric layer, annealing the silicon nitride waveguide.

3. The method of claim 1, wherein forming the silicon nitride waveguide comprises:
   forming a silicon nitride layer over the first dielectric layer; and
   patterning the silicon nitride layer.

4. The method of claim 3, comprising:
   after forming the silicon nitride layer, annealing the silicon nitride layer.

5. The method of claim 1, comprising:
   forming a fourth dielectric layer over the third dielectric layer;
   forming a first conductive structure in the fourth dielectric layer, wherein the first conductive structure is in contact with a modulator structure in the third dielectric layer;
   forming a fifth dielectric layer over the fourth dielectric layer; and
   forming a second conductive structure in the fifth dielectric layer, wherein the second conductive structure is in contact with the first conductive structure.

6. A method for forming a semiconductor device, comprising:
   forming a first dielectric layer over a first substrate;
   forming a silicon nitride waveguide over the first dielectric layer;
   forming a second dielectric layer over the silicon nitride waveguide;
   forming a composite over the second dielectric layer, wherein the composite comprises a semiconductor layer and one or more layers over the semiconductor layer;

removing the one or more layers to expose the semiconductor layer;

patterning the semiconductor layer, after the semiconductor layer is exposed, to form a semiconductor waveguide over the silicon nitride waveguide, wherein patterning the semiconductor layer exposes a top surface of the second dielectric layer; and forming a third dielectric layer over the top surface of the second dielectric layer, wherein a bottom surface of semiconductor waveguide is adjacent to the second dielectric layer, a first sidewall of the semiconductor waveguide is adjacent to the third dielectric layer, and a second sidewall of the semiconductor waveguide is adjacent to the third dielectric layer.

7. The method of claim 6, wherein removing the one or more layers comprises:

removing a second substrate over a third dielectric layer, wherein the third dielectric layer is over the semiconductor layer; and removing the third dielectric layer.

8. The method of claim 6, comprising:

after forming the silicon nitride waveguide and prior to the forming the second dielectric layer, annealing the silicon nitride waveguide.

9. The method of claim 6, wherein forming the silicon nitride waveguide comprises:

forming a silicon nitride layer over the first dielectric layer; and patterning the silicon nitride layer.

10. The method of claim 6, comprising:

forming a fourth dielectric layer over the third dielectric layer;

forming a first conductive structure in the fourth dielectric layer, wherein the first conductive structure is in contact with a modulator structure in the third dielectric layer;

forming a fifth dielectric layer over the fourth dielectric layer; and forming a second conductive structure in the fifth dielectric layer, wherein the second conductive structure is in contact with the first conductive structure.

11. A method for forming a semiconductor device, comprising:

forming a semiconductor layer;

forming a first dielectric layer over the semiconductor layer;

forming a silicon nitride layer over the first dielectric layer;

patterning the silicon nitride layer to define a silicon nitride waveguide;

performing an inversion operation such that the semiconductor layer is over the first dielectric layer;

patterning the semiconductor layer after performing the inversion operation to define a semiconductor waveguide; and forming a second dielectric layer over the semiconductor waveguide, wherein the second dielectric layer contacts the first dielectric layer, a first sidewall of the semiconductor waveguide, and a second sidewall of the semiconductor waveguide.

12. The method of claim 11, comprising:

forming a third dielectric layer over the silicon nitride waveguide prior to performing the inversion operation.

13. The method of claim 11, wherein patterning the semiconductor layer comprises patterning the semiconductor layer to define a modulator structure.

14. The method of claim 13, wherein the semiconductor waveguide is separated from the modulator structure by the second dielectric layer.

15. The method of claim 11, wherein:

forming the first dielectric layer comprises forming the first dielectric layer to contact the semiconductor layer, and forming the silicon nitride layer comprises forming the silicon nitride layer to contact the first dielectric layer.

16. The method of claim 11, wherein the semiconductor layer is a silicon layer.

17. The method of claim 1, wherein the bottom surface of the semiconductor waveguide is in contact with the first dielectric layer, the first sidewall of the semiconductor waveguide is in contact with the third dielectric layer, and the second sidewall of the semiconductor waveguide is in contact with the third dielectric layer.

18. The method of claim 1, wherein the third dielectric layer is in contact with the first dielectric layer.

19. The method of claim 6, wherein the bottom surface of semiconductor waveguide is in contact with the second dielectric layer, the first sidewall of the semiconductor waveguide is in contact with the third dielectric layer, and the second sidewall of the semiconductor waveguide is in contact with the third dielectric layer.

20. The method of claim 6, wherein the third dielectric layer is in contact with the second dielectric layer.

* * * * *